US 6,702,053 B2

(12) United States Patent
Nogi et al.

(10) Patent No.: US 6,702,053 B2
(45) Date of Patent: Mar. 9, 2004

(54) HYBRID CAR

(75) Inventors: Toshiharu Nogi, Hitachinaka (JP);
Takuya Shiraishi, Hitachinaka (JP);
Minoru Oosuga, Hitachinaka (JP);
Noboru Tokuyasu, Hitachi (JP); Yoko Nakayama, Otokuni (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/060,147

(22) Filed: Feb. 1, 2002

(65) Prior Publication Data
US 2002/0070060 A1 Jun. 13, 2002

Related U.S. Application Data

(63) Continuation of application No. 09/646,521, filed on Nov. 27, 2000.

(30) Foreign Application Priority Data

Mar. 19, 1998 (JP) .............................. 10-69761
Mar. 19, 1999 (WO) ................. PCT/JP99/01398

(51) Int. Cl.[7] .............. B60K 6/00; B60K 1/00; G06F 19/00
(52) U.S. Cl. .................. 180/65.2; 180/65.3; 180/65.4; 701/99
(58) Field of Search .............. 180/65.2, 65.3, 180/65.6, 65.4; 701/70, 99, 101, 103, 104, 105

(56) References Cited

U.S. PATENT DOCUMENTS

| 4,335,429 | A | * | 6/1982 | Kawakatsu | 364/424 |
|---|---|---|---|---|---|
| 5,657,625 | A | | 8/1997 | Koga et al. | 60/274 |
| 5,722,502 | A | * | 3/1998 | Kubo | 180/65.4 |
| 5,722,911 | A | * | 3/1998 | Ibaraki et al. | 477/3 |
| 5,775,449 | A | * | 7/1998 | Moroto et al. | 180/65.2 |
| 5,789,881 | A | * | 8/1998 | Egami et al. | 318/139 |
| 5,806,617 | A | * | 9/1998 | Yamaguchi | 180/65.2 |
| 5,826,671 | A | * | 10/1998 | Nakae et al. | 180/85.2 |
| 6,009,965 | A | * | 1/2000 | Takanohashi et al. | 180/65.2 |
| 6,237,709 | B1 | * | 5/2001 | Chubachi | 180/65.2 |
| 6,390,214 | B1 | * | 5/2002 | Takahashi et al. | 180/65.2 |

FOREIGN PATENT DOCUMENTS

| JP | 5-69328 | 3/1993 |
|---|---|---|
| JP | 5-272349 | 10/1993 |
| JP | 5-328526 | 12/1993 |
| JP | 8-61052 | 3/1996 |
| JP | 8-182114 | 7/1996 |
| JP | 9-72229 | 3/1997 |
| JP | 10-54263 | 2/1998 |
| JP | 10-89053 | 4/1998 |
| JP | 10-201110 | 7/1998 |
| JP | 10-246132 | 9/1998 |

* cited by examiner

Primary Examiner—Brian L. Johnson
Assistant Examiner—G B Klebe
(74) Attorney, Agent, or Firm—Crowell & Moring LLP

(57) ABSTRACT

By a lean burn operation, a highly efficient operation region is enlarged, the proportion of engine operation in a low torque condition is increased, and the proportion of motor operation using a battery is decreased. It is possible to provide a hybrid car of an engine-electric motor configuration which can effect a highly efficient operation without increasing the capacity of motor and that of battery.

6 Claims, 28 Drawing Sheets

F I G. 23
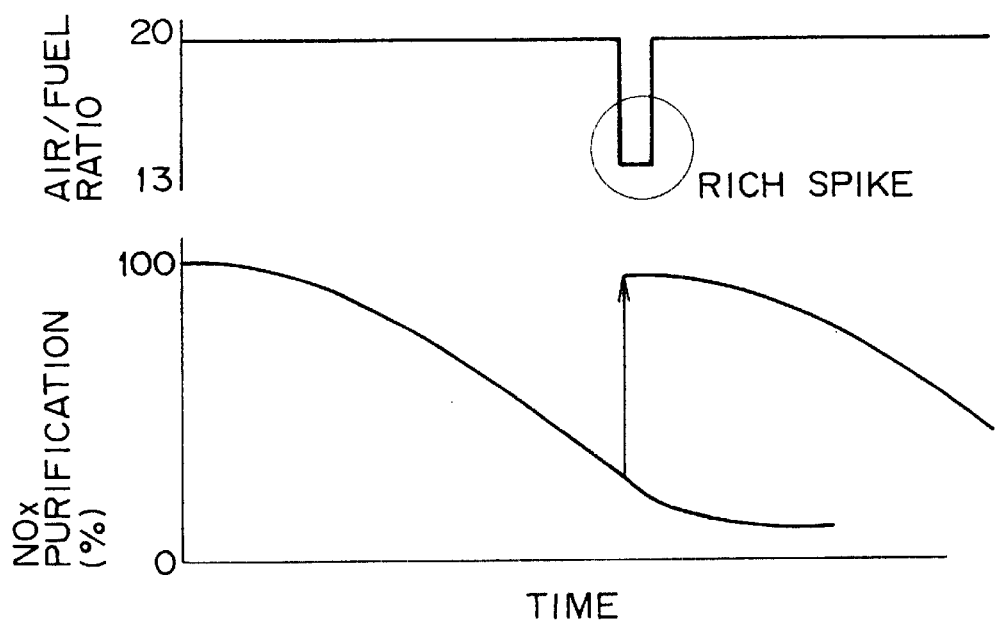
F I G. 24
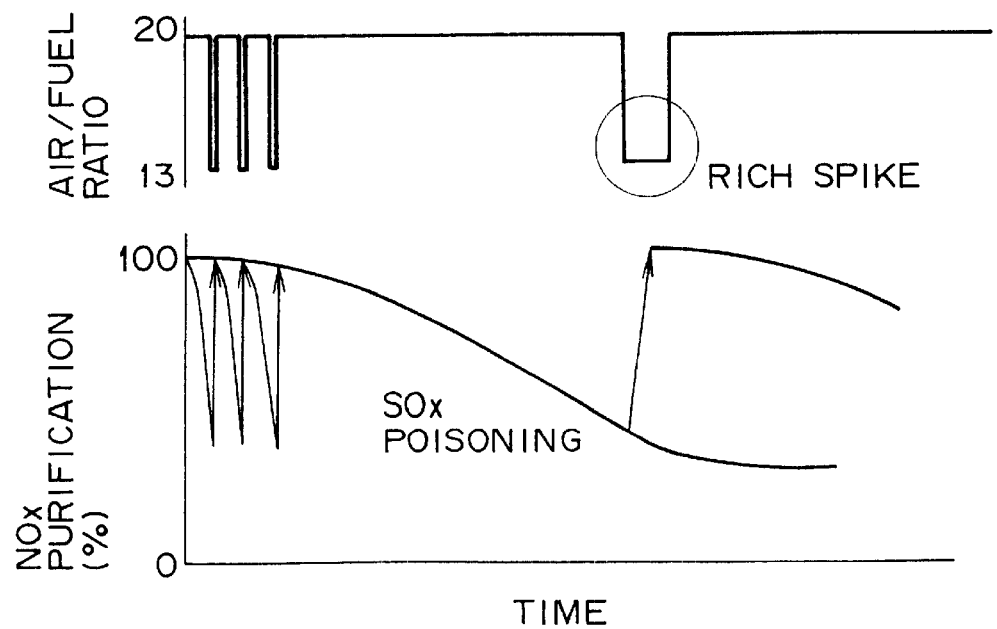

F I G. 27
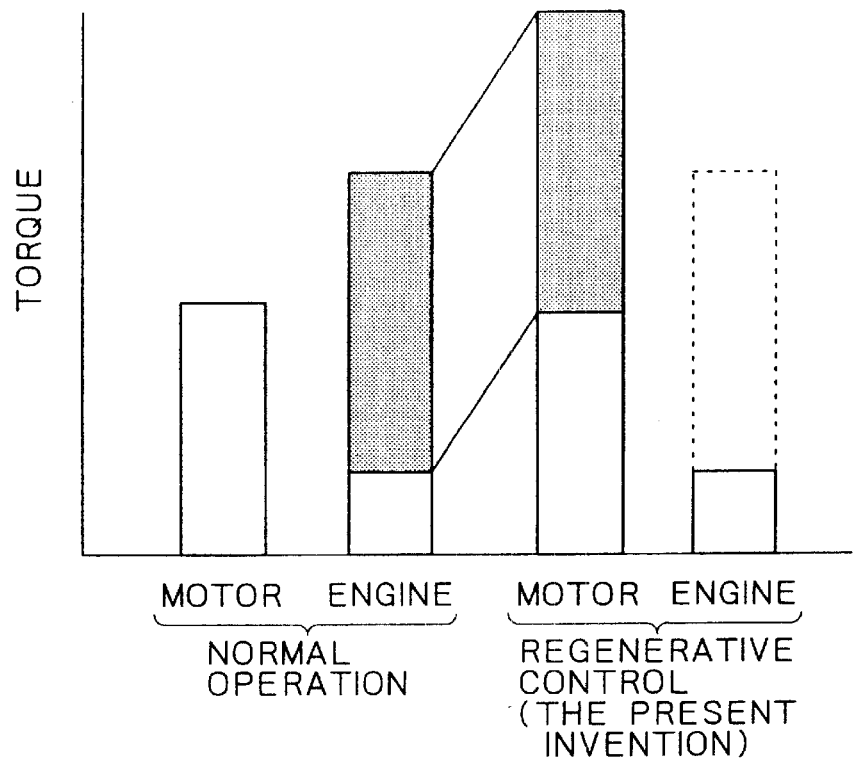
F I G. 28
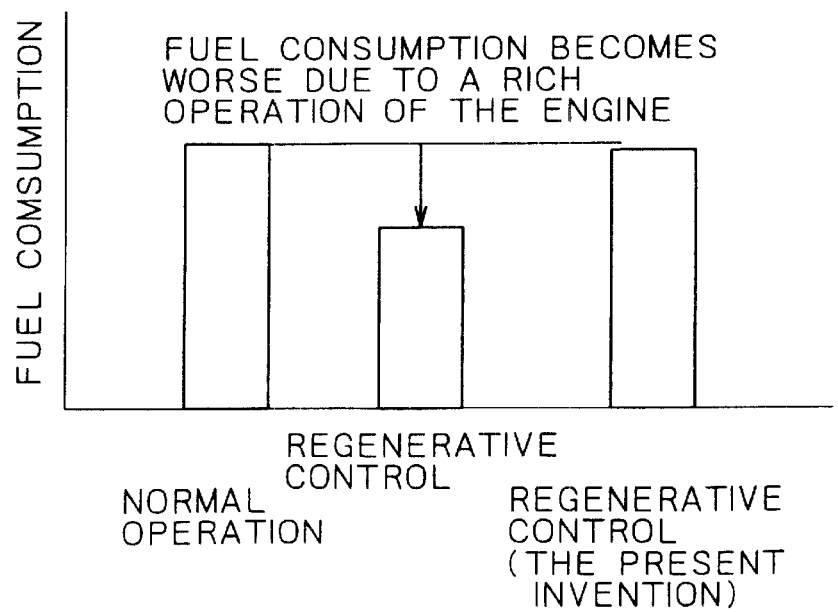

HYBRID CAR

This application is a continuation of application Ser. No. 09/646,521, filed Nov. 27, 2000.

TECHNICAL FIELD

The present invention relates to an apparatus and method for controlling a hybrid car having an engine and electric motors.

BACKGROUND ART

In a hybrid car using an engine and electric motors, a power generated by the engine is converted to an electric energy directly or through a generator, while the electric energy is converted to a mechanical energy by a motor or is stored in a battery. Such a hybrid car is advantageous in that the running distance can be made long in comparison with an electric car in which the supply of energy is done with a battery alone.

In Japanese Patent Laid-Open No. Hei 9-37410 there is disclosed a configuration provided with an engine, a power distributing mechanism, and motor generators.

In such a hybrid car, when the required driving torque is large, the car is driven by the engine, part of the engine power is distributed to a motor generator which is for assisting the vehicle speed, allowing the motor generator to act as a generator, then with the generated power from the generator, the torque from a driving motor is assisted to increase the driving torque.

On the other hand, when the required driving torque is small and the vehicle speed is high, part of the engine driving torque is recovered from a motor generator which is for assisting the driving torque, and with this electric power, a differential motor generator is allowed to operate as a motor, thereby permitting a vehicular operation at a high speed.

In such a configuration, when the car is to be driven at a low speed and at a small driving torque required (a small driving output required), it is necessary that the vehicular operation be done in a region of a small engine torque. In such a small engine torque region, there is a tendency to an increase of pumping loss and deterioration of fuel economy because the vehicular operation is performed in a closed state of the throttle valve. If the operation in a large pumping loss region is restricted, there arises the problem that the engine operating region becomes small and the motor size increases to assist torque for acceleration. If the engine operation is topped in low speed and low torque conditions, the operational proportion using the battery increases, thus requiring a larger battery capacity or more frequent charge/discharge control for the battery. A highly efficient operation can be realized by combining the engine with a transmission, selecting a shift gear (a change gear ratio in case of a stepless change gear ratio) and performing operation in a region where the engine torque is as high as possible. However, there arises the problem that, since the operating torque has already approached its maximum level, there remains no marginal torque in acceleration, thus resulting in a poor accelerative feeling and deterioration of the driving performance.

Accordingly, it is the first object of the present invention to provide a hybrid car having an engine and electric motors which car can effect a highly efficient operation without increasing the motor and battery capacities.

It is the second object of the present invention to ensure a superior driving performance in a highly efficient operation.

DISCLOSURE OF INVENTION

The above first object of the present invention can be achieved by allowing a lean burn to take place to enlarge the region of the highly efficient operation and increasing the proportion of operation with the engine at a low torque while decreasing the proportion of motor operation using the battery. Lean burn is advantageous in that the pumping loss can be diminished because the throttle valve is opened. The pumping loss of the engine at a low torque may be diminished by controlling the intake valve timing to control the amount of intake air.

The above second object can be achieved by selecting a region of a large number of revolutions of the engine to ensure a marginal torque for operation at a required engine output. For example, whether the driver of the car attaches importance to fuel economy or to the driving performance is judged in accordance with a change in the degree of opening of an accelerator pedal. If the driver attaches importance to the driving performance, there is selected an engine operation region of a large marginal torque. In the high engine speed region, driving performance takes precedence over other points although fuel economy becomes worse than at the highest efficiency point.

BRIEF DESCRIPTION OF DRAWINGS

FIG. 23 shows an operation example of NOx catalyst.

FIG. 24 shows an operation example of the NOx catalyst.

FIG. 27 is an operation explaining diagram according to the present invention.

FIG. 28 shows an effect obtained by the present invention.

BEST MODE FOR CARRYING OUT THE INVENTION

Embodiments of the present invention will be described hereinunder with reference to the drawings.

Figure 1:
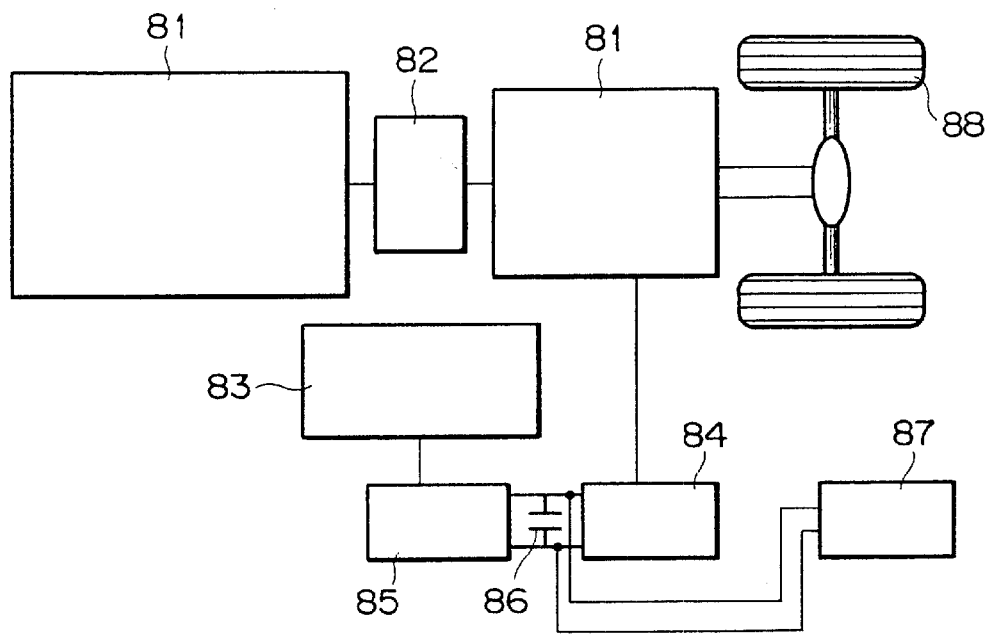
FIG. 1 is a system diagram according to the present invention.

FIG. 1 illustrates a system configuration according to the present invention. The system comprises an engine 80, a drive assisting motor generator 81, a differential motor generator 83, a power distributing mechanism 82, a condenser 86, a battery 87, and inverters 84, 85. As the engine 81 it is desirable to use a cylinder-direct fuel injection type engine which can control the output of the engine by the air/fuel ratio. In the cylinder-direct fuel injection type engine, fuel is injected directly into a cylinder and the mixture distribution can be controlled, so it is possible to perform an ultra-lean burn operation. Driving wheels 88 are controlled by the engine 80 the driving assisting motor generator 81, and the differential motor generator 83. The driving torque distribution is controlled so as to maximize the engine efficiency. The engine and the motors are controlled to an optimum state by means of a control unit (not shown).

Figure 2:
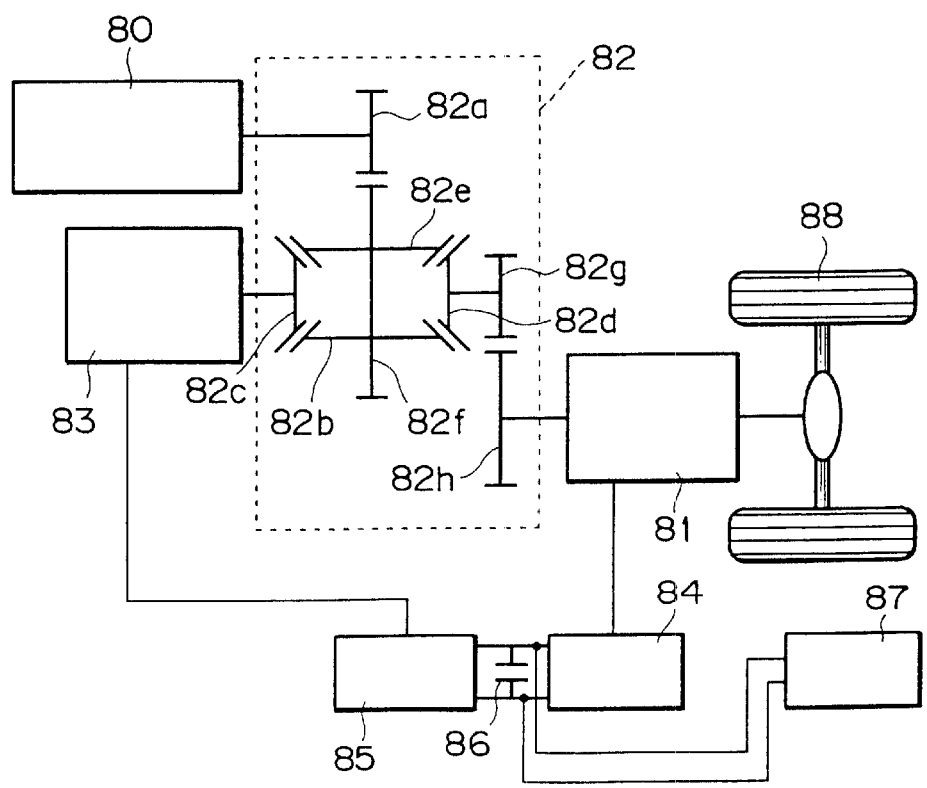
FIG. 2 is a system diagram according to the present invention.

FIG. 2 shows a configuration example of the power distributing mechanism 82. The distribution of output is performed by helical gears 82a~82h. The output of the engine is transmitted to the gear 82f via the gear 82a and the driving wheels 88 are driven by the gears 82g and 82h. The motor generator ("MG" hereinafter) 81 is coaxial with the gear 82h and the gear output is transmitted as it is to the driving wheels when the MG is not supplied with electricity. When the MG 83 operates as a motor and actuates the gear 82c, the rotation of the gear 82g is added and the rotation of a driving shaft becomes high, thus permitting a high-speed vehicular operation. The electric power stored in the battery 87 is used to drive the drive assisting MG 81 via the inverter 84 or drive the differential MG via the inverter 85.

Figure 3:
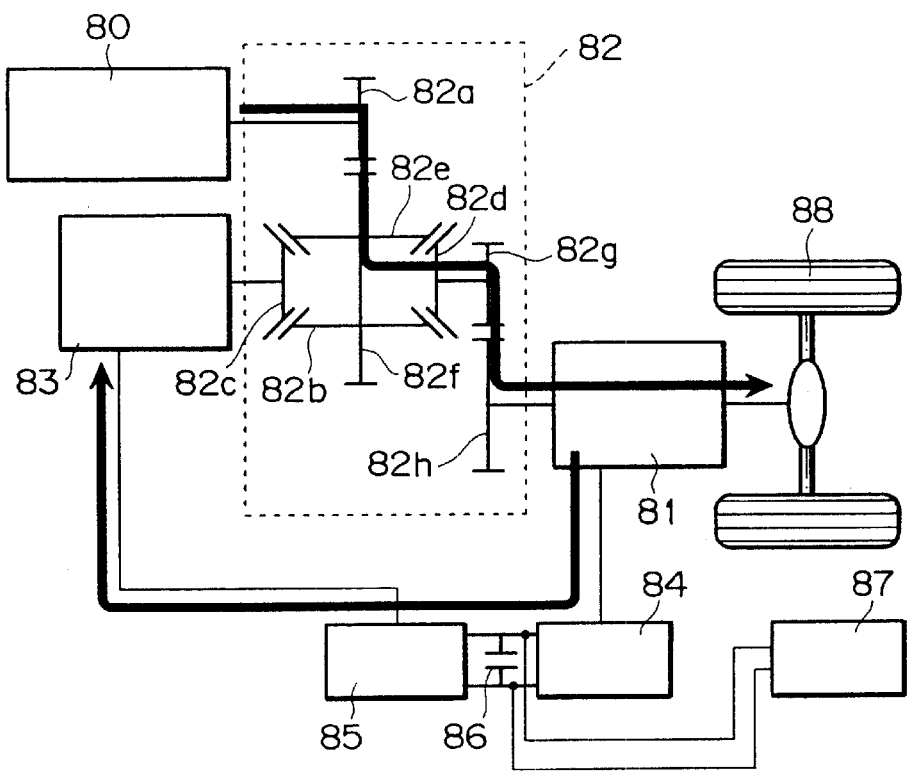
FIG. 3 is an operation explaining diagram according to the present invention.

FIG. 3 shows a case where the vehicle speed is assisted in basic operations of the present invention. The output from the engine 80 is transmitted to the driving wheels 88 via the gears 82a, 82e, 82d, and 82g. In a high-speed level road traveling at a small driving torque, the drive assisting MG 81 is allowed to act as a generator and the vehicle speed assisting differential MG 83 is allowed to act as a motor using the electric power generated by the generator. When the MG 83 causes the gear 82c to rotate, it is possible to increase the output rotation of the gear 82g.

Figure 4:
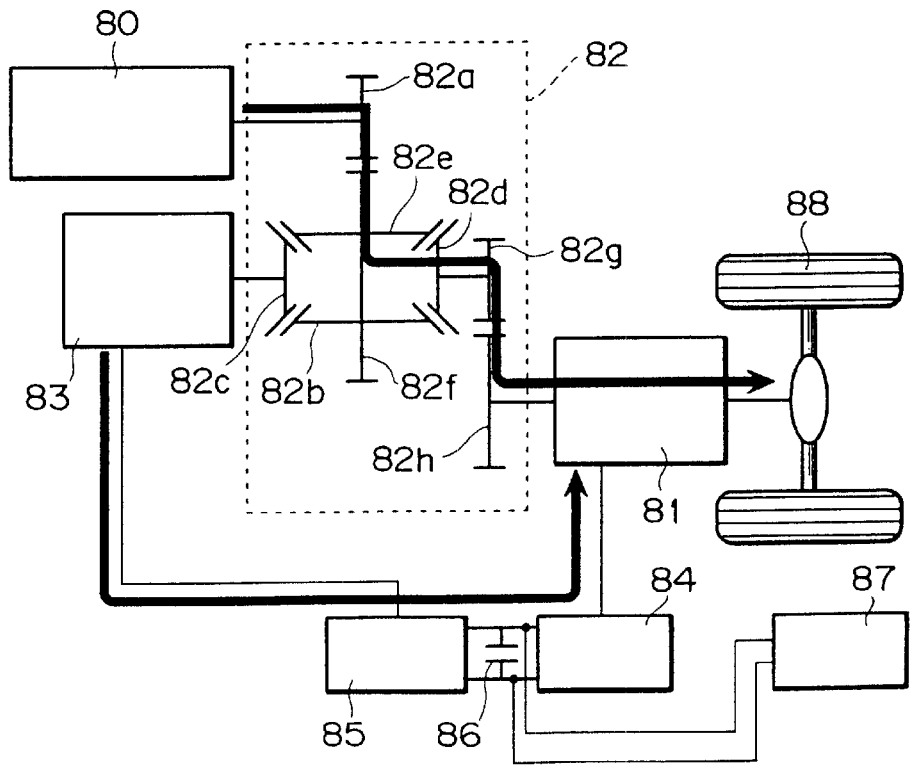
FIG. 4 is an operation explaining diagram according to the present invention.

FIG. 4 shows a case where the driving torque is assisted in basic operations of the present invention. The output from the engine 80 is transmitted to the driving wheels 88 via the gears 82a, 82e, 82d, and 82g. In a high-speed traveling at a large driving torque, part of the engine torque is distributed by the power distributing mechanism 82 and the vehicle speed assisting differential MG 83 is operated to assist the driving torque. Thus, by distributing the engine power through the power distributing mechanism 82 and by controlling the vehicle speed assisting MG 83 to an optimum state, it is possible to control the driving torque.

Figure 5:
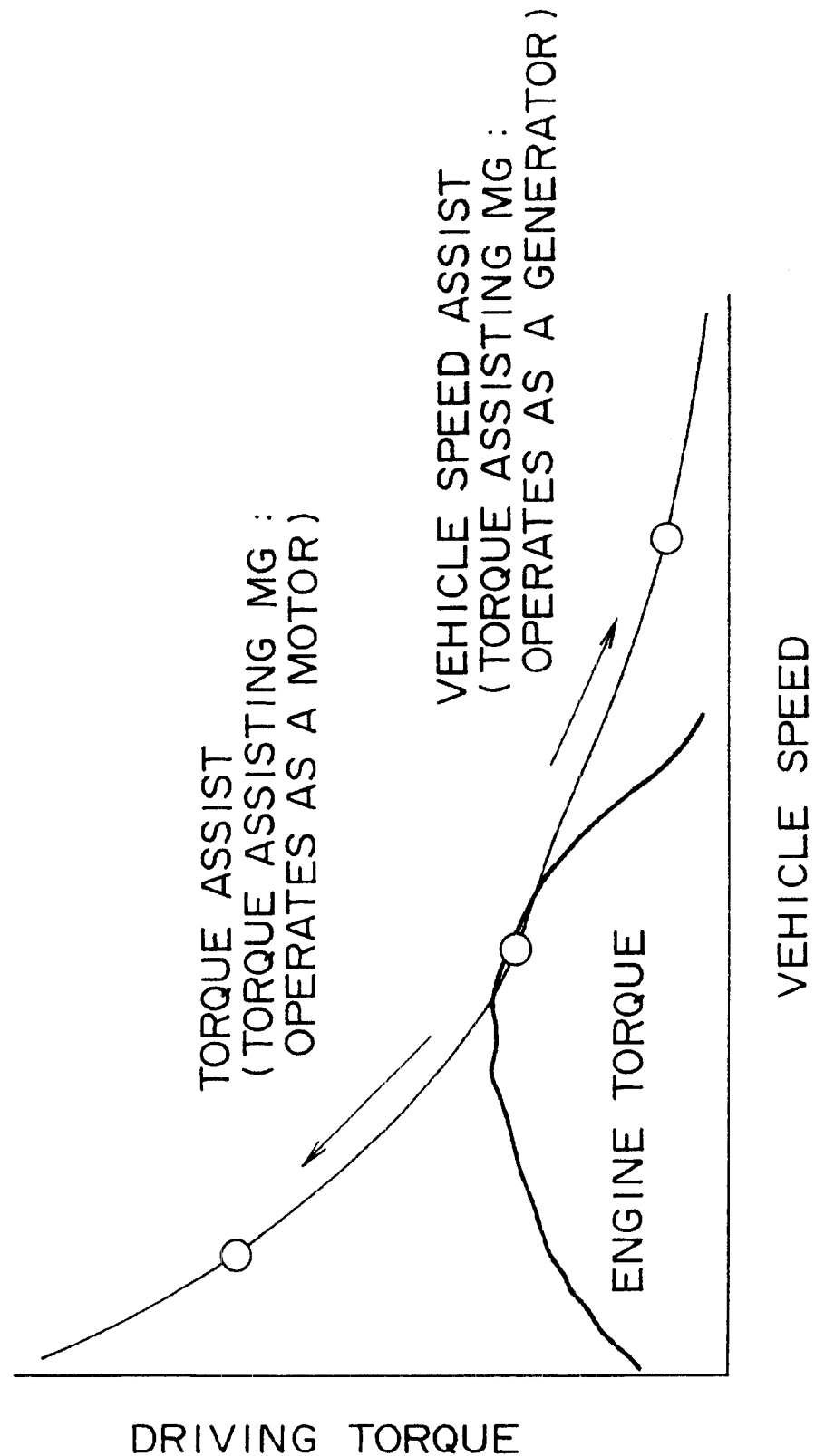
FIG. 5 is an operation explaining diagram according to the present invention.

FIG. 5 shows a relation between vehicle speed and driving torque. In the case where a larger driving torque than the engine torque is required at the same engine output, the torque assisting MG is allowed to act as a motor and the engine torque and the motor torque are combined together to increase the driving torque. On the other hand, in the case where a high vehicle speed is needed, the torque assisting MG is allowed to operate as a generator, while the vehicle speed assisting differential MG is allowed to act as a motor, to assist the vehicle speed. By so doing, even at one engine operating point it is possible to change the driving torque and the vehicle speed at the same output.

Although the above description refers to differential gears as the power distributing mechanism, there may be used another mechanism such as a planetary gearing.

Figure 6:
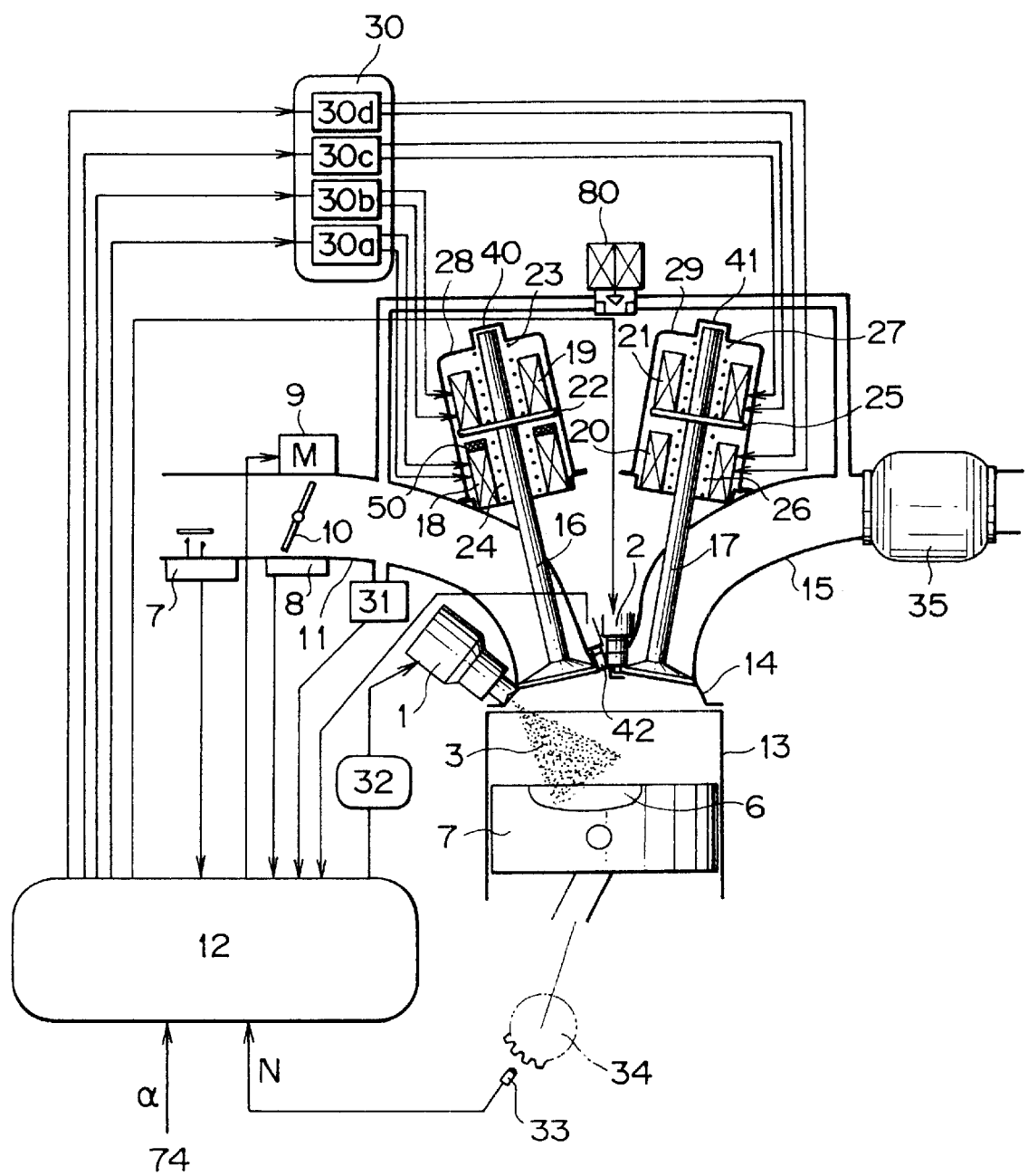
FIG. 6 shows a configuration of an engine.

FIG. 6 shows a configuration example of an engine. Air is introduced into an engine 13 via an air flow sensor 7, a throttle valve 10, an intake pipe 11, and an intake valve 16. The quantity of air, which is detected by the air flow sensor 7, can be controlled by changing the degree of opening of the throttle valve 10 and that of the intake valve 16. An internal pressure of each intake pipe and that of each cylinder are detected by an internal intake pipe pressure sensor 31 and an internal cylinder pressure sensor 42, respectively. As to the intake valve, for example, a movable portion 22 moves under the action of an electromagnetic force by applying a voltage to solenoids 18 and 19 from a drive circuit 30, so that the intake valve 16 connected thereto performs an opening or closing motion. The drive circuit may be incorporated in an engine control unit 12. Also as to an exhaust valve 17, the same operation as above is performed. Fuel is fed from an injector 1 which injects fuel directly into a cylinder and which is driven by a drive circuit 32. The throttle valve is opened and closed by means of a motor 9 and the degree of opening thereof is detected by a throttle sensor 8. An accelerator opening, a, is detected by an accelerator opening sensor (not shown) and intake and exhaust valves are controlled in accordance with at least an accelerator opening sensor signal. A controller 12 controls the throttle valve and the intake and exhaust valves in accordance with the sensor signal.

According to such a configuration, since fuel is injected directly into each cylinder, the air-fuel mixture present in the cylinder can be controlled directly and it is possible to effect a vehicular operation at a high air/fuel ratio, that is, in a lean burn condition.

Consequently, the vehicular operation can be done with the throttle valve open, whereby it is possible to diminish the pumping loss. Further, as noted above, the quantity of intake air in each cylinder can be controlled by controlling the opening/closing timing and period of intake and exhaust valves, so the quantity of air can be adjusted without relying on the throttle valve, which is more effective in diminishing the pumping loss.

Figure 7:
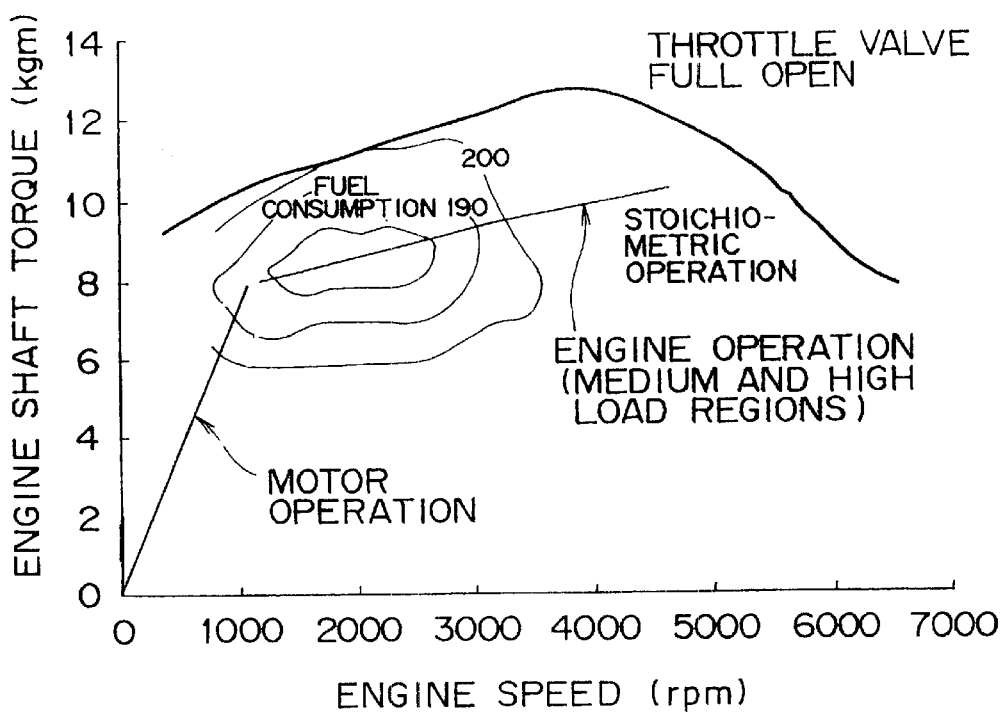
FIG. 7 is a diagram explanatory of operation of a conventional system.

FIG. 7 shows engine torque and fuel consumption characteristics. In a region of a large engine shaft torque, fuel consumption is small and fuel economy is good. This is because with an increase of the engine shaft torque the degree of opening of the throttle valve becomes larger and the pumping loss decreases. It is because the air/fuel ratio in this engine is set rich that the best point of fuel economy lies at a lower opening than the full opening of the throttle valve. The engine efficiency can be enhanced by operating the engine so as to be in a medium and high load region. On the other hand, when the engine torque is small, the pumping loss increases, so there is performed operation using a motor. In the conventional hybrid system, therefore, the proportion of motor operation is large and it is necessary to make a charge/discharge control for the motor and increase the battery capacity. Moreover, since the motor operation is continued up to a high torque, there arises the necessity of using a large motor. Because of an increase in weight of the vehicle body due to an increase in weight of the motor and battery, the fuel economy becomes worse even if it is improved by a highly efficient vehicular operation, and the improvement of fuel economy becomes less effective as a whole.

Figure 8:
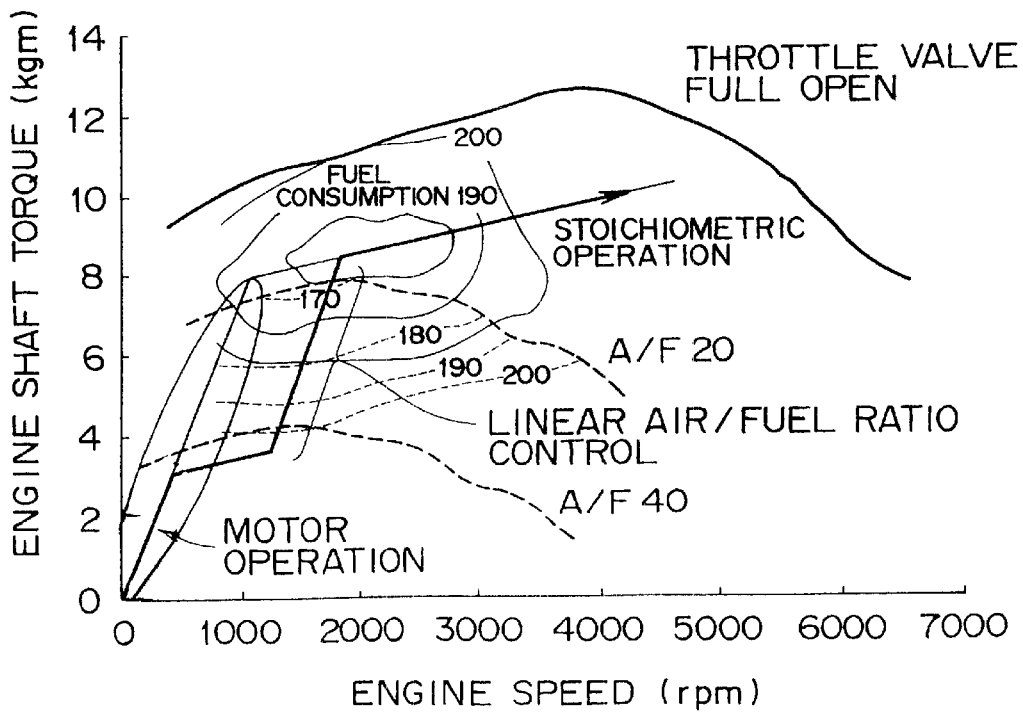
FIG. 8 is an operation explaining diagram according to the present invention.

FIG. 8 shows an engine operating method in the present invention. If the air/fuel ratio is set large like 20 or 40 relative to a stoichiometric ratio (14.7), the torque in a full open operation becomes small. At this time, the degree of opening of the throttle valve becomes large and the pumping loss can be decreased, so the fuel economy can be improved even in an operational region where the engine torque is low. Consequently, the proportion of motor operation becomes smaller, thus permitting the use of a small-sized motor and a small-capacity battery, with consequent reduction in weight. For example, when a further engine output is needed in a vehicular operation at an air/fuel ratio of 40, a change is made to a smaller air/fuel ratio and the torque is increased thereby. When the air/fuel ratio is set smaller than 20, there is performed a stoichiometric operation (14.7), and if an additional engine output is needed, the engine speed is increased.

Figure 9:
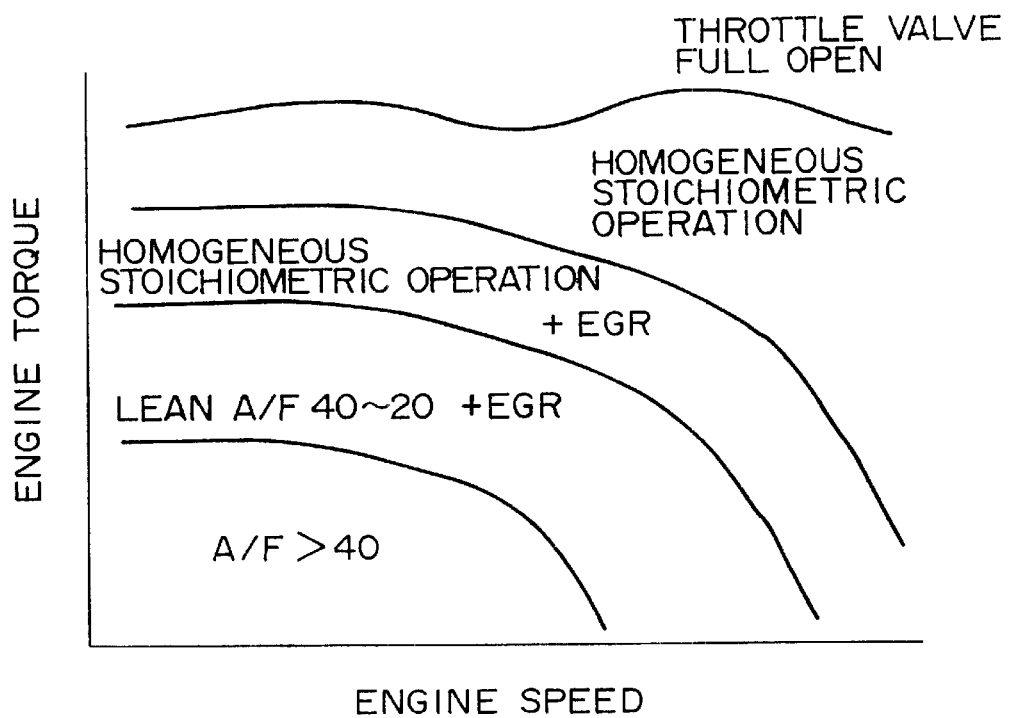
FIG. 9 shows an example of air/fuel ratio and EGR control.

FIG. 9 shows a target air/fuel ratio and the addition of EGR (exhaust gas recirculation) relative to engine torque and engine speed. When the engine torque and engine speed are low, namely, in a low load condition, there is performed an ultra-lean burn operation at an air/fuel ratio of 40 or more to decrease the consumption of fuel. As the load increases, a shift is made to an operation at an air/fuel ratio of 20 to 40 plus EGR, then to an operation at the stoichiometric air/fuel ratio (14.7) plus EGR, and with a further increase of load, a shift is made to an operation with EGR not added. The addition of EGR permits a decrease of NOx. With the throttle valve full open, EGR is stopped and a large quantity of air is introduced into each cylinder to increase the engine output, thereby allowing a larger quantity of fuel to burn.

Figure 10:
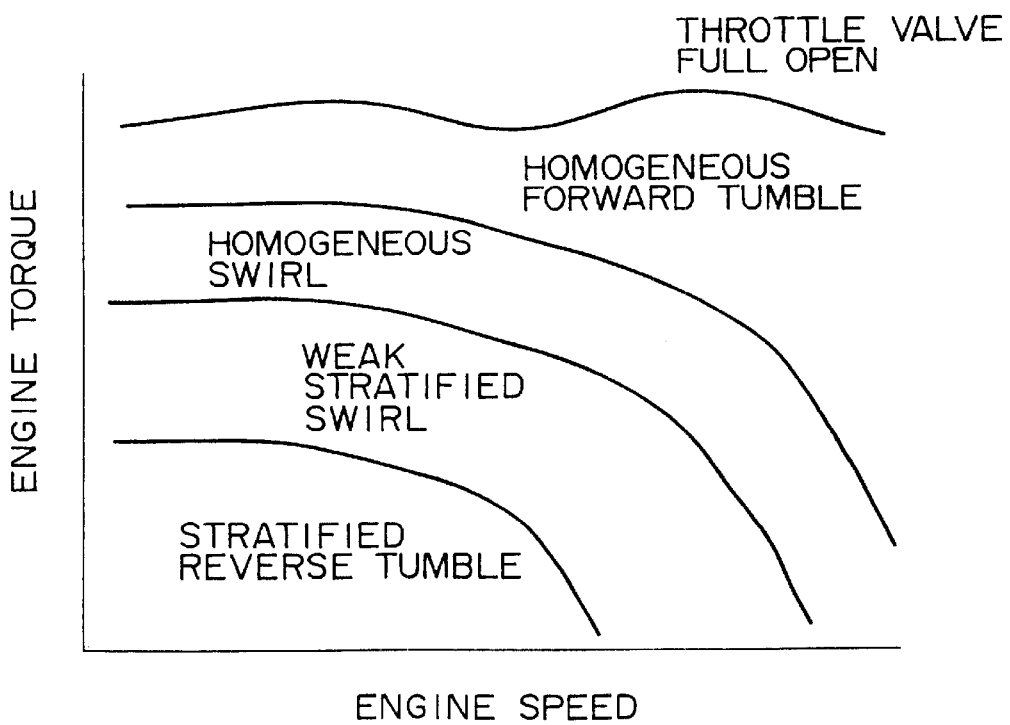
FIG. 10 shows an example of an air flow controlling method.

FIG. 10 shows an example of controlling an air flow pattern in the engine. In an ultra-lean burn operation at an air/fuel ratio of 40 or more, namely, in a low load condition involving low engine torque and engine speed, it is necessary that the air-fuel mixture be concentrated (stratified) in the vicinity of a spark plug. A reverse tumble flow is formed within the engine and fuel is conveyed toward the spark plug by a current of air. In a vehicular operation at an increased load and at an air/fuel ratio of 20 to 40 plus EGR, if the air-fuel mixture is concentrated too much around the spark plug, there occurs a deficiency of oxygen and smoke is apt to occur. To avoid this inconvenience, the flow in the cylinder is swirled to prevent such a concentration of the mixture in the cylinder. The swirl is retained easily even when the piston approaches top dead center in compression, so is effective in promoting the mixing of air and fuel. In case of addition of EGR, the swirl is also effective in improving the mixing of EGR with the mixture and stabilizing the combustion. The swirl is formed also in the operation at a stoichiometric air/fuel ratio (14.7) plus EGR. As the load further increases, it is necessary to introduce a large quantity of air in order to increase the output in an operational condition with EGR not added, and the flow depends on the shape of each intake pipe, without providing resistance in the intake valve and pipe. For the improvement of output it is important to promote the mixing of air and fuel in each cylinder and increase the rate of air utilization. By forward tumble, the fuel present in the piston cavity is also raked out to promote the air-fuel mixing.

Figure 11:
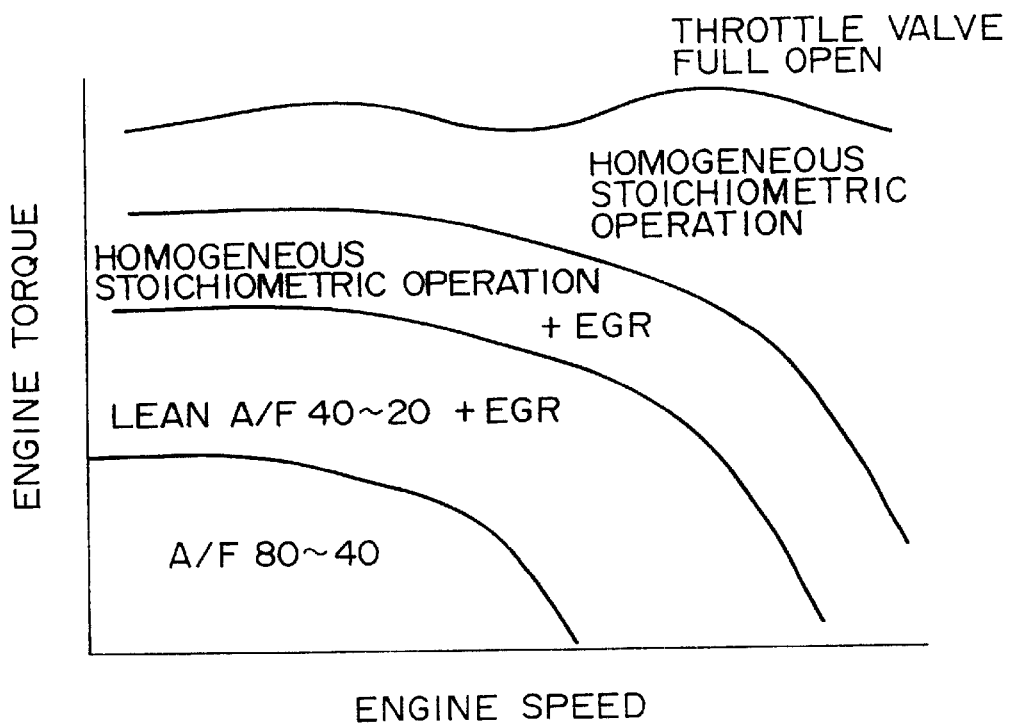
FIG. 11 shows another example of air/fuel ratio and EGR control.

FIG. 11 shows another example of a target air/fuel ratio and the addition of EGR relative to engine torque and engine speed. In a low load condition involving low engine torque and low engine speed there is performed an ultra-lean burn operation at an air/fuel ratio of 80 to 40 to decrease the consumption of fuel. As the load increases, a shift is made to an operation at an air/fuel ratio of 20 to 40 plus EGR, then to an operation at the stoichiometric air/fuel ratio (14.7) plus EGR, and with a further increase of load, a shift is made to an operation with EGR not added. By the addition of EGR it is possible to decrease NOx. With the throttle valve full open, EGR is stopped and a large quantity of air is introduced into each cylinder to increase the engine output, thereby allowing a larger quantity of fuel to burn.

Figure 12:
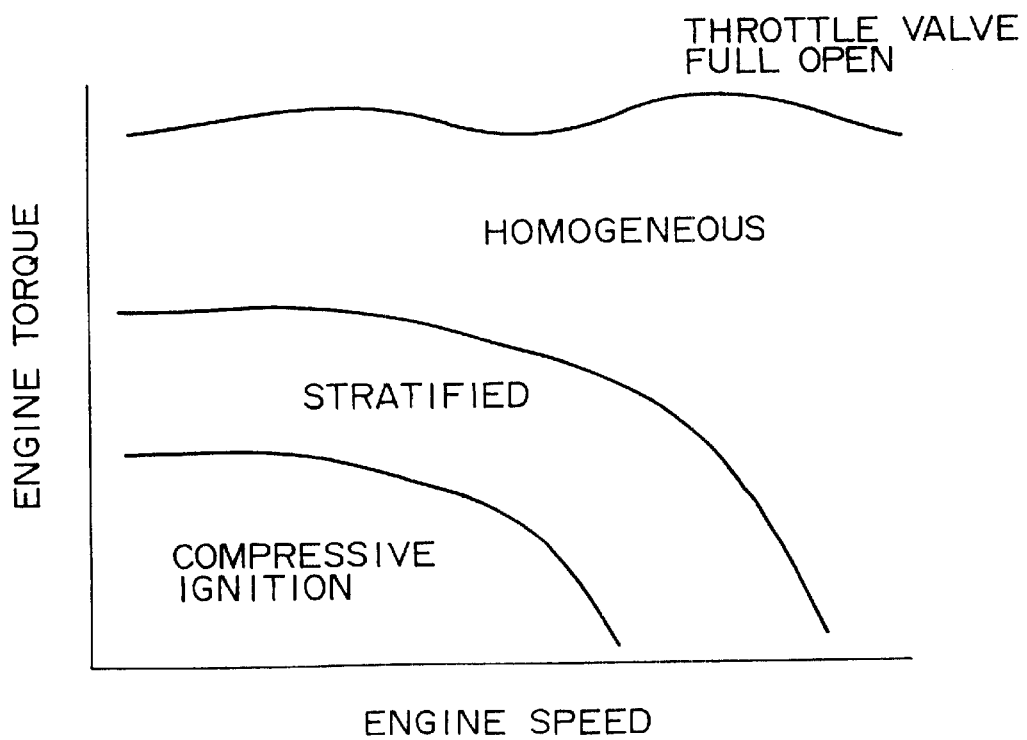
FIG. 12 shows an example of a combustion controlling method.

FIG. 12 shows an example of controlling combustion. In a low load condition wherein the engine torque and engine speed are low, the mixture is ignited not by flare propagated from a spark plug but by the compression heat of piston. In this case, since the mixture is ignited at various positions, the propagation distance becomes short and it is possible to effect combustion using a very lean mixture such as an air/fuel ratio of 80. In an operational region of a smaller air/fuel ratio there is performed a stratified combustion in which the mixture is concentrated around the spark plug. Where the air/fuel ratio is made still smaller, combustion is conducted using a homogeneous mixture of air and fuel mixed homogeneously in each cylinder.

Figure 13:
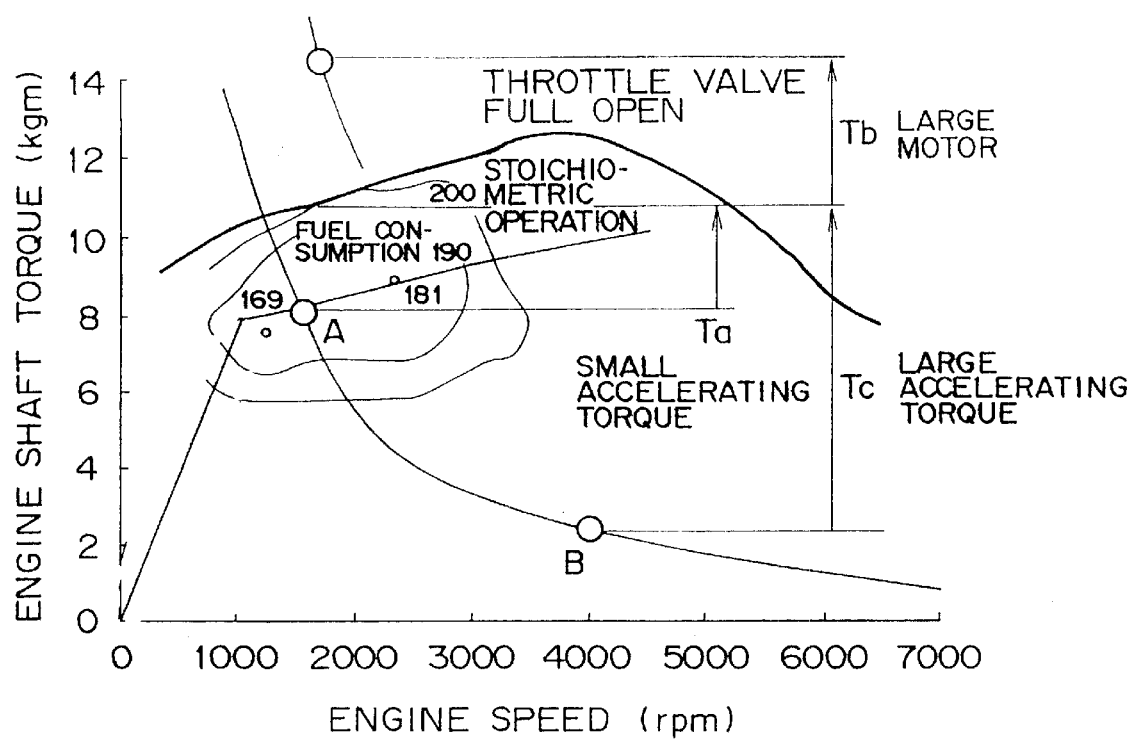
FIG. 13 is a diagram explanatory of operation of a conventional system.

FIG. 13 shows an engine controlling method in an accelerating operation. Where a required engine output is satisfied, it is possible to choose point A or point B for example. For the improvement of fuel economy there is performed operation at point A at which the pumping loss is small. When acceleration is to be done in this operation, it is necessary to assist torque by means of a motor because there is no torque margin up to the maximum engine torque. In this case there arises the problem that the motor becomes large. If operation is performed at point B, since the throttle valve opening is small, the pumping loss increases and fuel economy becomes worse. In this case there is a margin up to the maximum torque, so a sufficient accelerative feeling is obtained even without motor assistance (or even if the motor assistance is small). That is, for attaining both a satisfactory fuel economy and a satisfactory feeling of acceleration, it is necessary to make the motor large.

Figure 14:
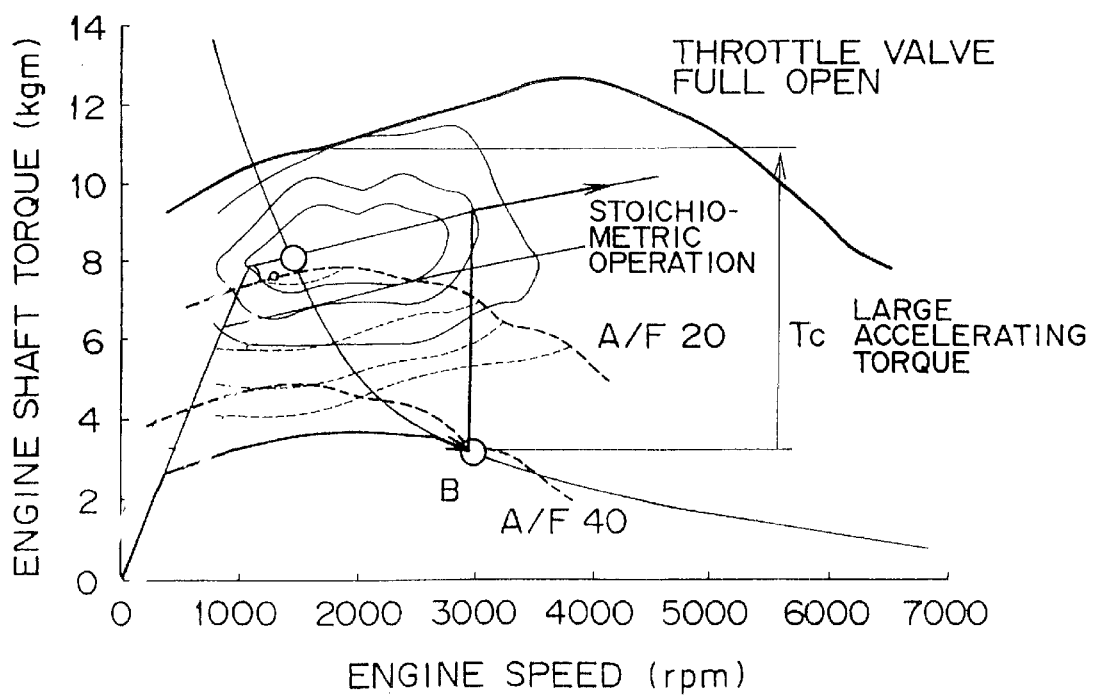
FIG. 14 is an operation explaining diagram according to the present invention.

FIG. 14 shows a control example in the present invention. By operation at an air/fuel ratio of 40 the degree of opening of the throttle valve can be made large even at point B, so that the pumping loss can be decreased and fuel economy can be improved. In this case it is possible to get an accelerative feeling because there is a margin up to the maximum engine torque. Although point B is a little inferior in point of fuel economy as compared with point A, but is selected in an operational region in which importance is attached to driving performance. The vehicle driver's intention can be judged using data on the degree of opening of the accelerator pedal. For example, when the degree of opening of the accelerator pedal changes very frequently, it is judged that the driver thinks much of driving performance, while when the degree of opening of the accelerator pedal changes little and the vehicle is in normal operation, it is judged that the driver thinks much of fuel economy.

Figure 15:
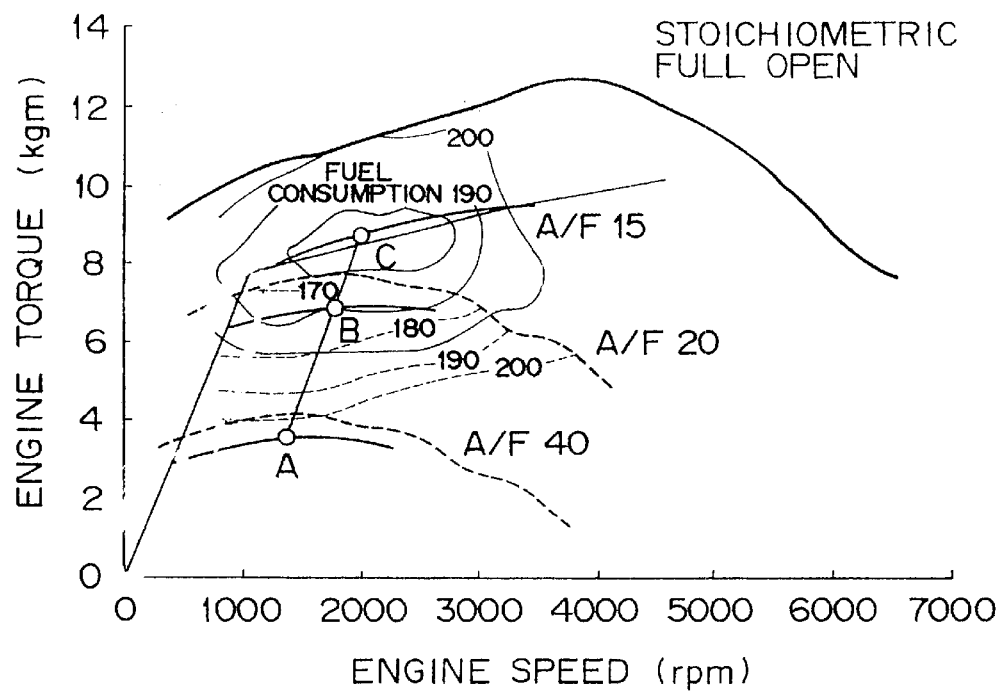
FIG. 15 shows another example of operation according to the present invention.

FIG. 15 shows another operation example in the present invention. Air/fuel ratios of 40, 20 and 15 are varied not linearly but stepwise. This is advantageous in that the air/fuel ratio can be controlled more easily. Besides, in the air/fuel ratio range from 20 to 15 it is possible to avoid an air/fuel ratio at which NOx is produced. Thus, this method is effective as a measure against the exhaust gas. However, if the air/fuel ratio is changed stepwise, the engine torque also changes and there arises a problem in point of driving performance, so the degree of opening of the throttle valve is controlled by means of a motor for example to eliminate the difference in torque.

Figure 16:
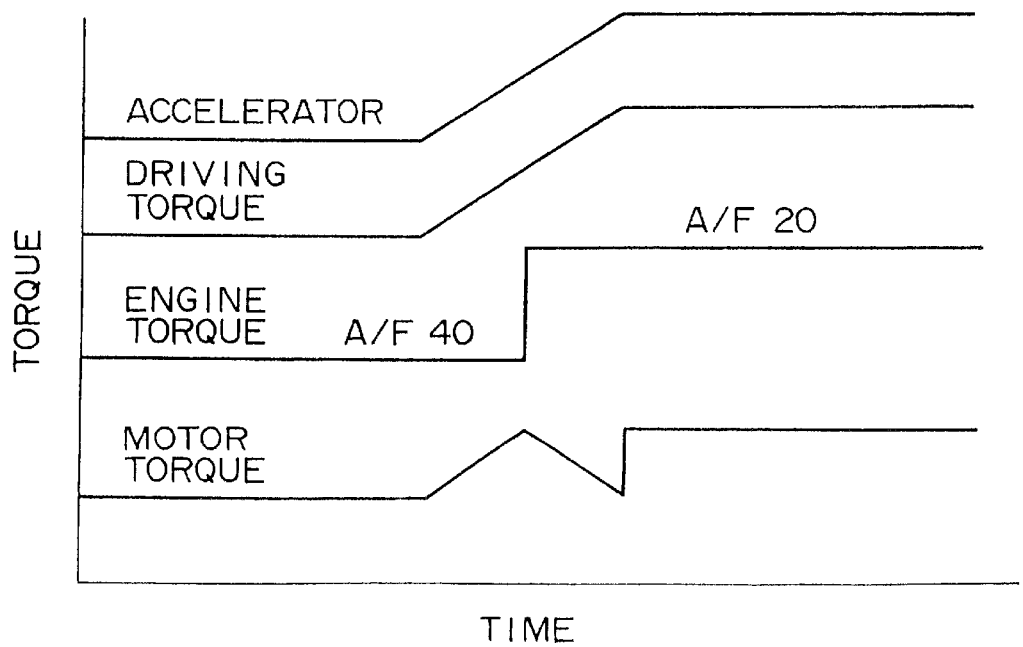
FIG. 16 shows a driving torque control in a transient time.

In the present invention, since the driving shaft is provided with a motor, when the driving torque is to be controlled to match the degree of opening of the accelerator pedal, as shown in FIG. 16, first the torque is controlled precisely by the motor, and the air/fuel ratio of the engine is switched over from 40 to 20 when the torque has reached a certain level or higher. At this time there occurs a difference in torque, so the occurrence of such a difference in driving torque can be prevented by adjusting the motor torque. In this case, since the responsivity to the target torque differs between the engine and the motor, the torque response in a transient time is controlled using dynamic engine and motor models.

Figure 17:
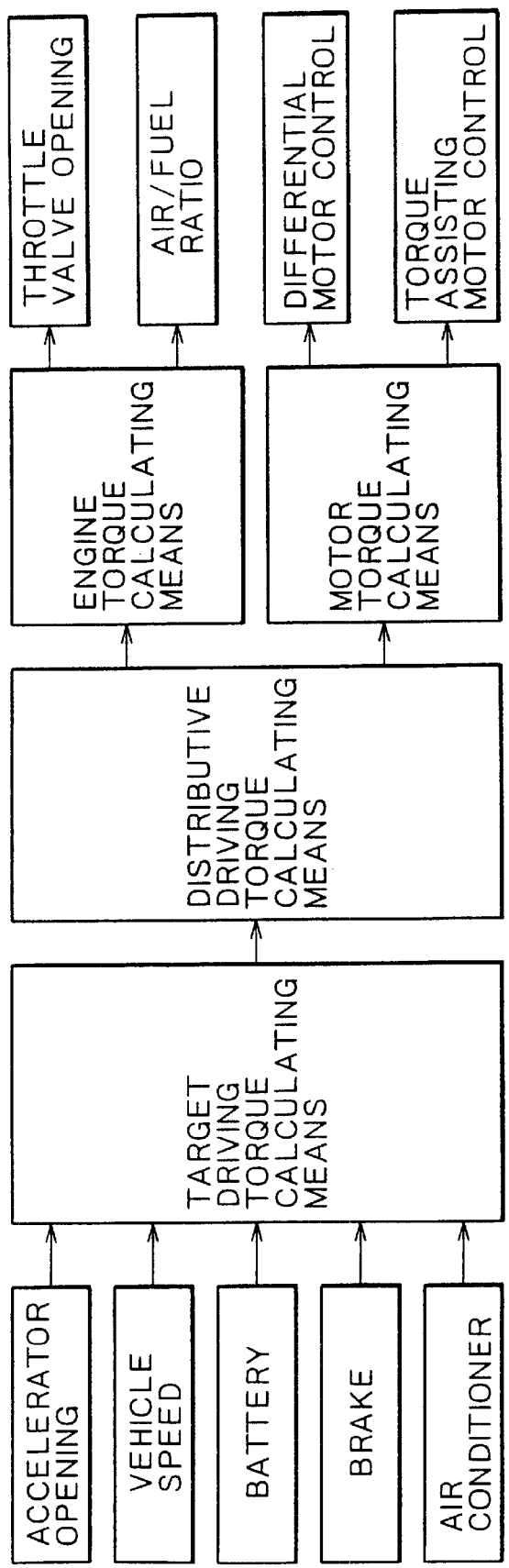
FIG. 17 is a block diagram according to the present invention.

FIG. 17 is a block diagram according to the present invention. A target driving torque is calculated on the basis of signals relating to the degree of opening of the accelerator pedal, vehicle speed, battery capacity, brakes, and air conditioner. The target driving torque is distributed into an engine torque and a motor torque by a distributive driving torque calculating means and a control is made for the throttle valve opening, air/fuel ratio, vehicle speed assisting MG, and torque assisting MG. In such a configuration, in addition to what has been described above, the engine is stopped during idling, while during deceleration, energy is recovered positively by the torque assisting MG and is stored in the battery. In a lean burn operation, the degree of opening of the throttle valve is large and the engine brake is apt to become less effective, therefore, the brakes are applied by the torque assisting MG to prevent the vehicle driver from feeling any incongruity. When the battery is in operation 100% and it is impossible to recover energy from the torque assisting MG, the throttle or intake valves in the engine are closed, allowing engine brake to operate.

Figure 18:
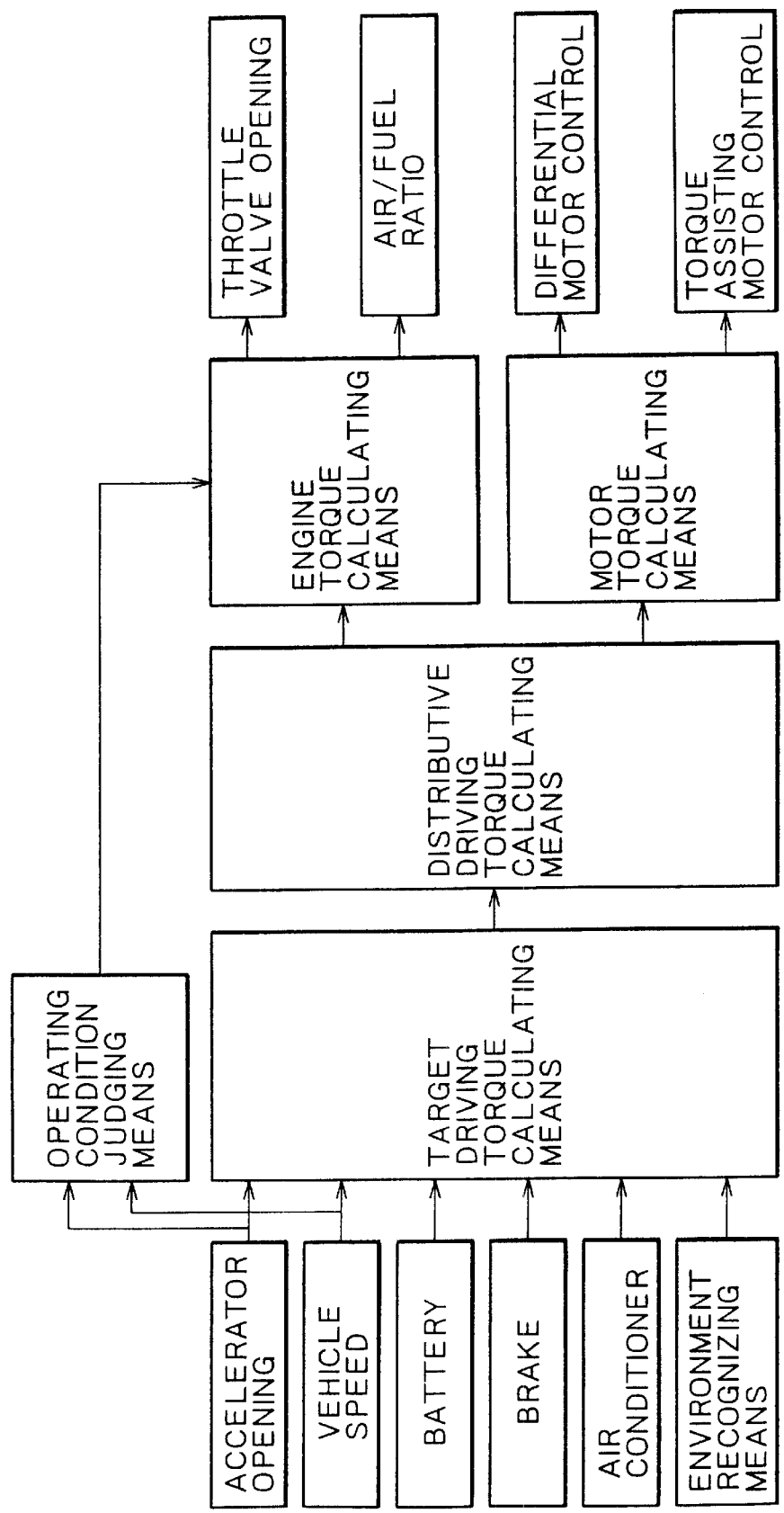
FIG. 18 is a block diagram according to the present invention.

FIG. 18 shows a further embodiment of the present invention. The current operating condition is judged on the basis of such data as the degree of opening of the accelerator pedal and the vehicle speed and it is judged whether the vehicle driver thinks much of fuel economy or driving performance, then on the basis of result of the judgment there is made an engine torque control. If importance is attached to fuel economy, there is performed an operation superior in fuel economy with little marginal torque. On the other hand, if importance is attached to the driving performance, there is performed an operation with a marginal torque although the fuel economy becomes worse to a slight extent.

Figure 19:
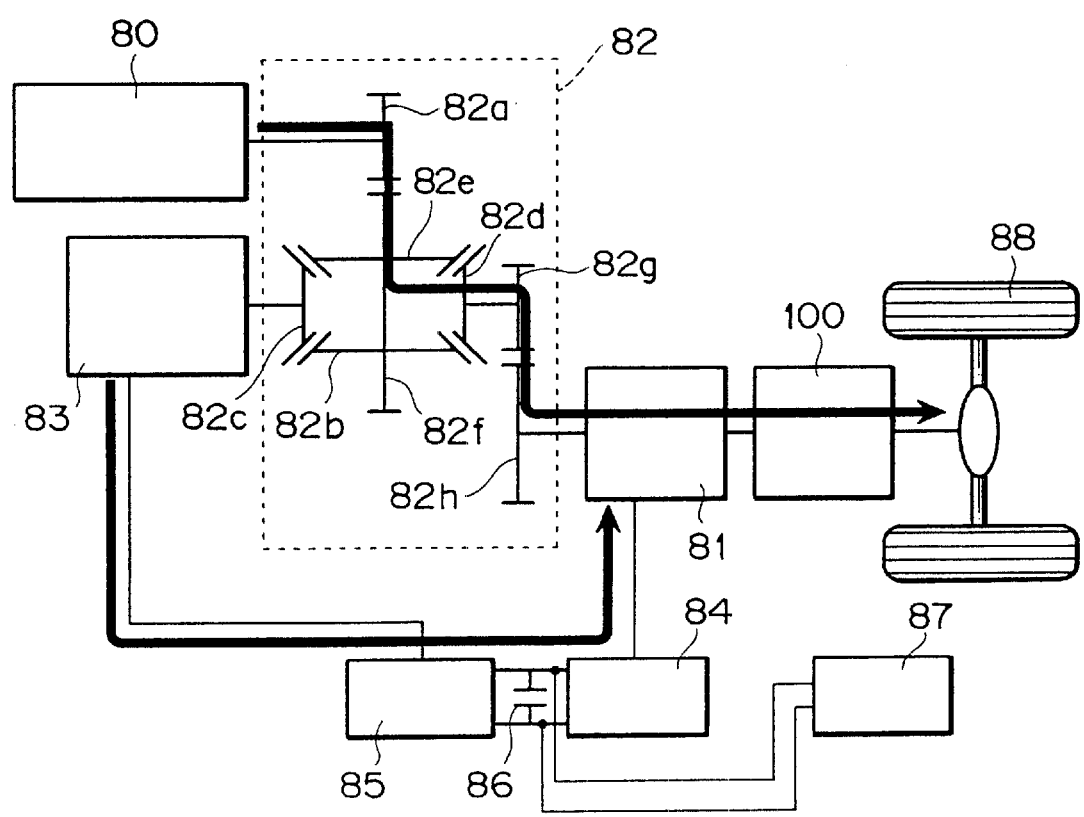
FIG. 19 shows a system according to a further embodiment of the present invention.

FIG. 19 shows a further embodiment of the present invention. A transmission 100 (stepped or stepless) is disposed on an output side of a driving motor. On the basis of the result of calculation made by a target driving torque calculating means there is determined an appropriate distribution of engine torque and motor torque and a change gear ratio is calculated.

Figure 20:
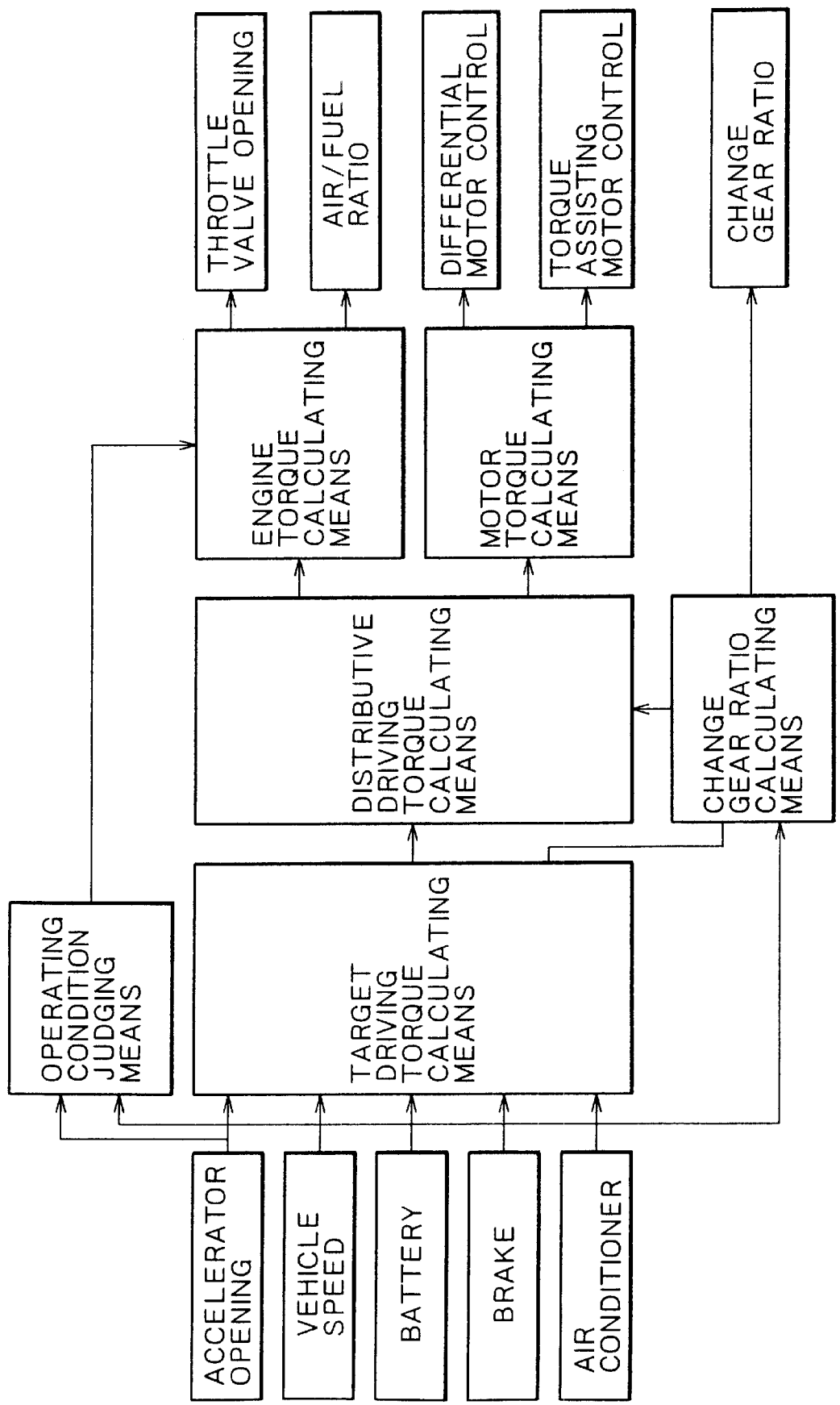
FIG. 20 is a block diagram according to the present invention.
Figure 21:
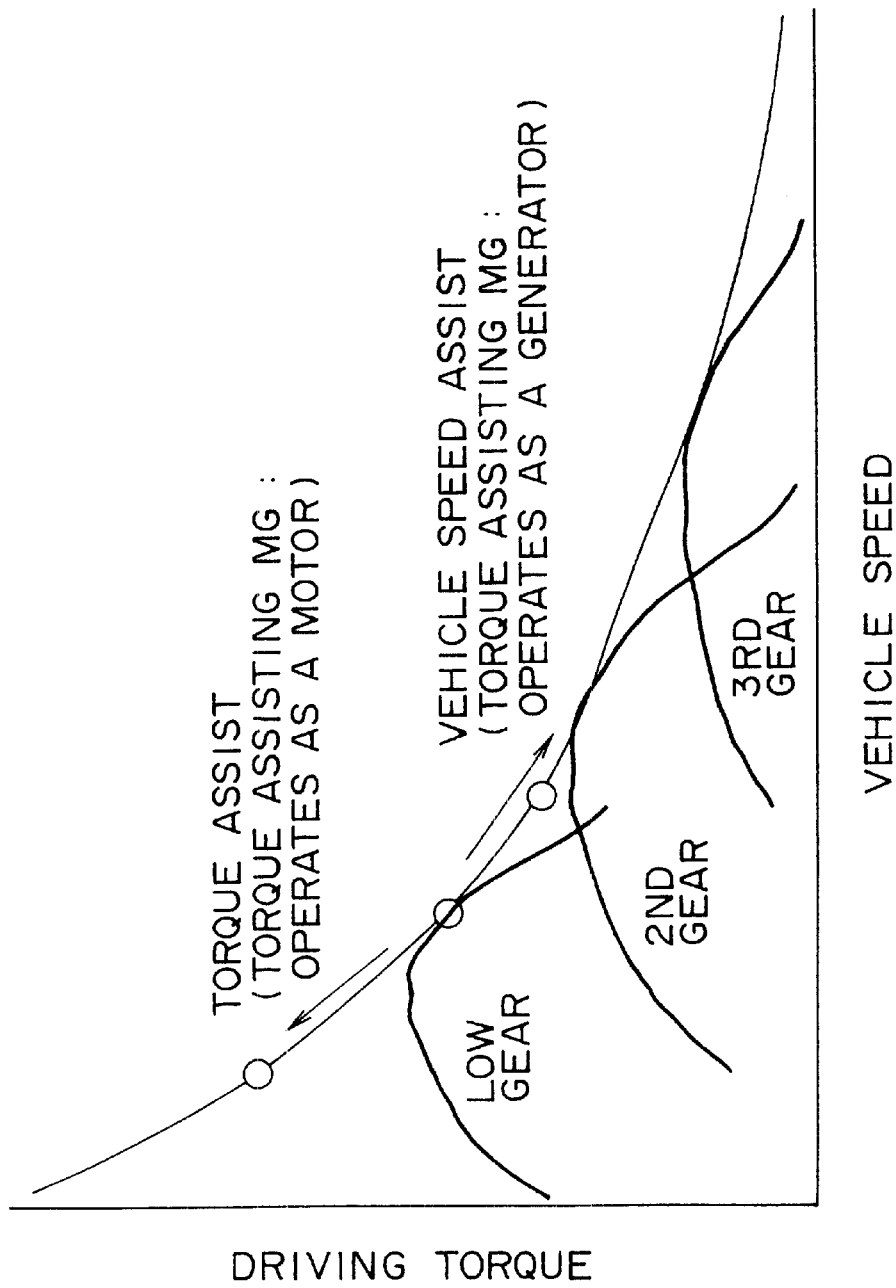
FIG. 21 is an operation explaining diagram according to the present invention.

As shown in FIG. 20, the driving torque is controlled in terms of a change gear ratio and the torque between shift gears is controlled by the foregoing torque assisting MG and vehicle speed assisting differential MG. In this way it is possible to control the driving torque even with a small MG capacity and it is possible to widen the driving torque control range, thus permitting operation without using a torque converter of a low transfer efficiency or a fluid coupling. Consequently, the driving torque control can be done by both stepped gears and MGs as shown by the graph in FIG. 21.

Figure 22:
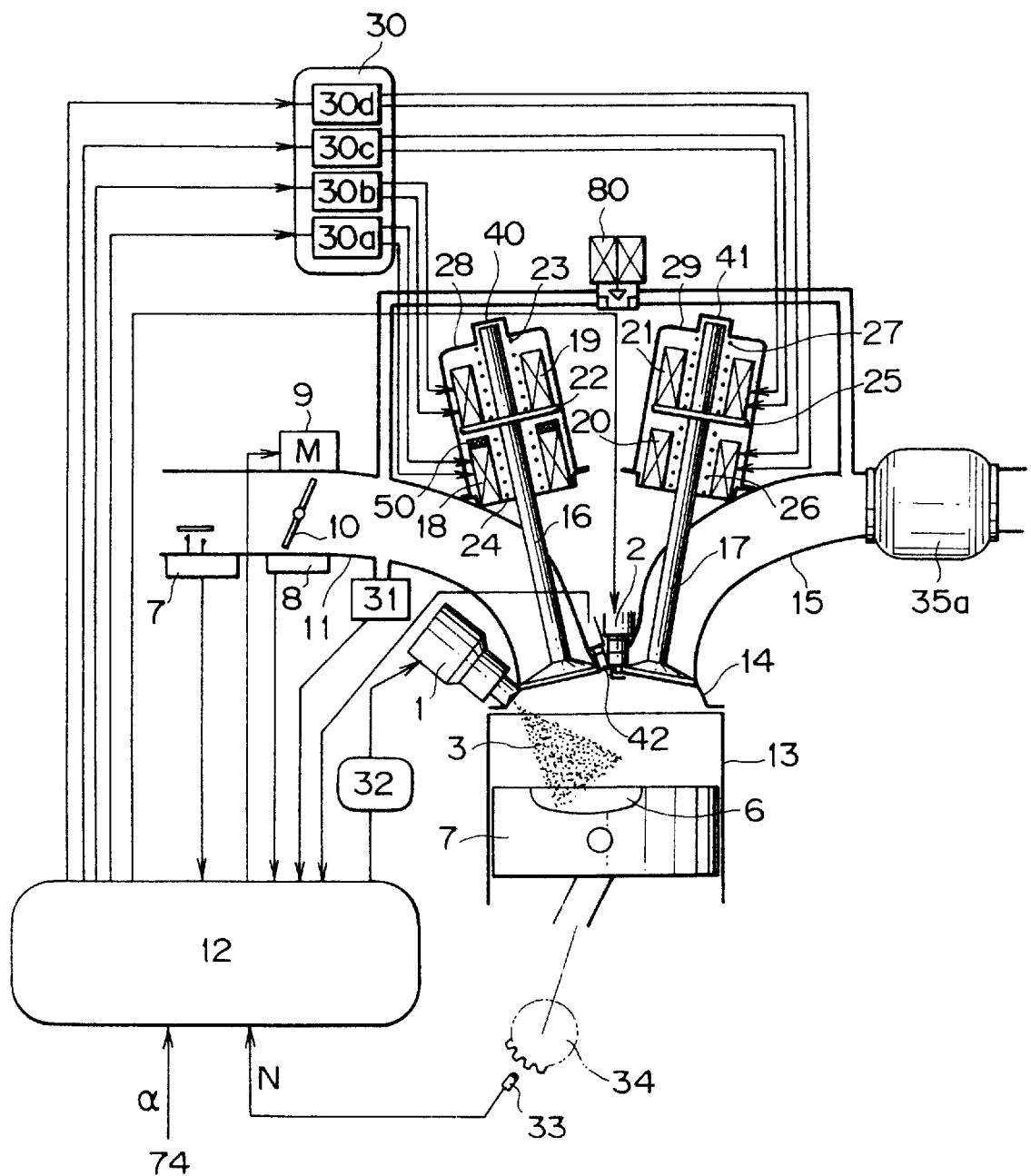
FIG. 22 shows a further embodiment of the present invention.

FIG. 22 shows a further embodiment of the present invention. A lean NOx catalyst 35a is used for the purification of NOx in a lean burn operation. In a lean burn operation there is an excess of oxygen in the exhaust pipe, that is, the interior atmosphere of the exhaust pipe is an oxidizing atmosphere, so that NOx cannot be reduced by the ordinary type of a ternary catalyst. With a lean catalyst, NOx is adsorbed on the catalyst and can be reduced even in an oxidizing atmosphere by unburnt hydrocarbons present in the exhaust gas in a rich operation. The engine used in this embodiment is a cylinder-direct fuel injection type engine and is equipped with variable intake and exhaust valves. This engine is effective also for a lean burn operation involving injection through intake ports.

FIG. 23 shows how the percentage purification of a lean NOx catalyst changes with the lapse of time. It is seen that the percentage purification of NOx decreases with the lapse of time. This is because the amount of NOx adsorbed on the catalyst increases as the lean operation continues and there occurs a release of NOx incapable of being adsorbed on the catalyst. If a rich operation is performed at an air/fuel ratio of say 13, the adsorbed NOx is reduced by unburnt hydrocarbon and the percentage purification is improved again.

As shown in FIG. 24, with the lapse of a longer time, SOx adheres to the surface of the catalyst if the fuel used contains much sulfur, resulting in a lowering of the percentage purification. But even in this case it is possible to improve the percentage purification by performing a rich operation. In this case it is necessary that the rich operation be continued for a longer time than in the release of adsorbed NOx.

In both cases referred to above it is necessary to conduct a rich operation, resulting in that both engine efficiency and fuel economy become worse.

Figure 25:
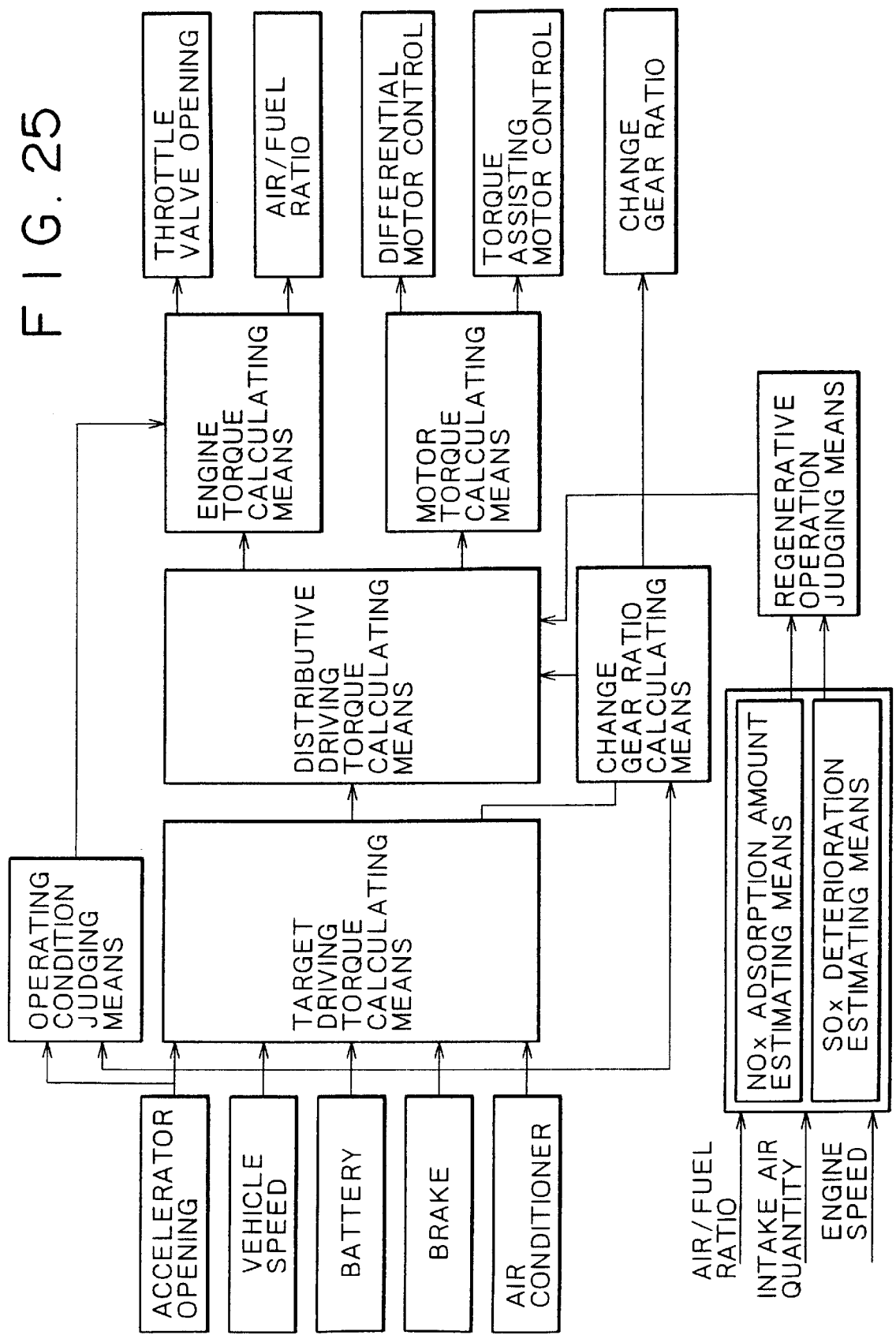
FIG. 25 is a block diagram according to the present invention.

In view of this point, as shown in FIG. 25, the amount of NOx adsorbed is estimated on the basis of data relating to air/fuel ratio, intake air quantity, engine speed, and fuel injection timing, and the degree of deterioration of SOx is estimated on the basis of the length of operation time for example. Alternatively, an NOx sensor is disposed at an outlet of the NOx catalyst or an NOx sensor and an oxygen sensor are disposed at inlet and outlet of the NOx catalyst to detect the degree of adsorption on the NOx catalyst or the degree of deterioration of SOx, followed by the execution of a regenerative operation while making control for engine torque and motor torque.

Figure 26:
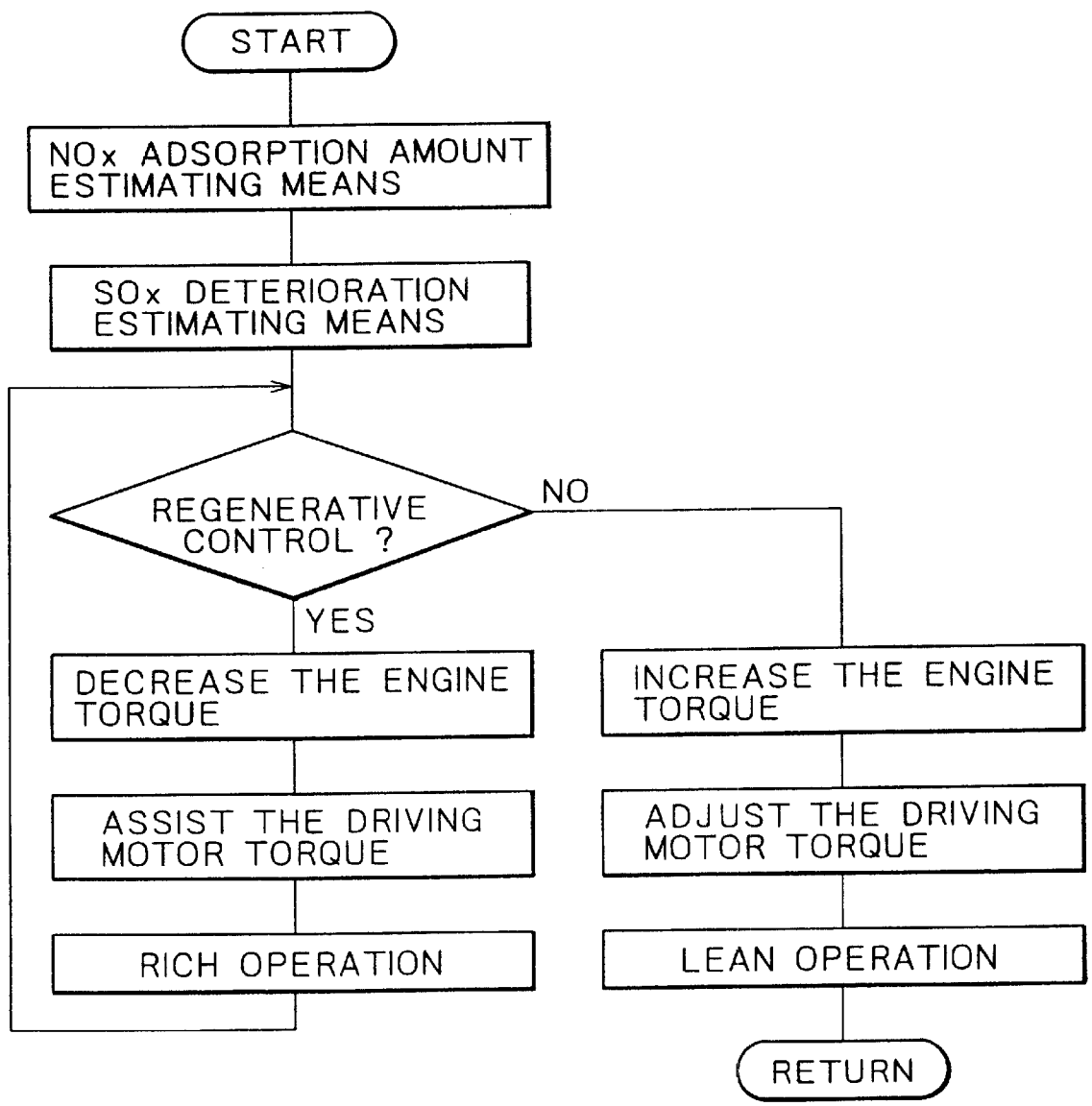
FIG. 26 is a flow chart according to the present invention.

Referring now to FIG. 26, which is a flow chart, the amount of NOx adsorbed and the degree of deterioration of SOx are estimated and it is judged whether a control for regeneration is to be made or not. Where a control for regeneration is needed, the engine torque is set small so that the amount of fuel consumed in the engine is decreased in a range in which the regenerative control can be done. As the engine torque decreases, the torque of the driving shaft decreases and the driving performance becomes worse. Therefore, the torque of the driving motor is increased so as to eliminate a difference in torque, if any. Thereafter, a rich operation is performed and the regenerative control is executed. Since the rich operation is thus carried out in a state of a small engine torque, that is, in a state of a small amount of fuel consumed, there is little deterioration in fuel economy as the whole of the vehicle. When the regenerative control is over, the engine torque is increased again, the torque of the driving motor is adjusted so that there is no difference in torque, and in this state there is performed a lean operation.

FIG. 27 shows in what proportions the driving torque is taken partial charge of by engine and motor. In normal operation the engine is mainly used for the operation, while in the regenerative control the engine torque is diminished and the motor torque is adjusted so that there is no difference in torque.

As a result, a deterioration range of fuel economy attributable to a rich operation of the engine becomes narrower and it is possible to effect the regeneration of catalyst without deterioration in fuel economy, as compared with the case where the regenerative control is made in the normal operation, as shown in FIG. 28.

Since it is necessary to perform a rich operation for a relatively long period of time in comparison with the case where adsorbed NOx is to be reduced, there occurs a marked deterioration of fuel economy. For this reason, only during SOx regeneration there may be performed such a control as in the present invention.

Figure 29:
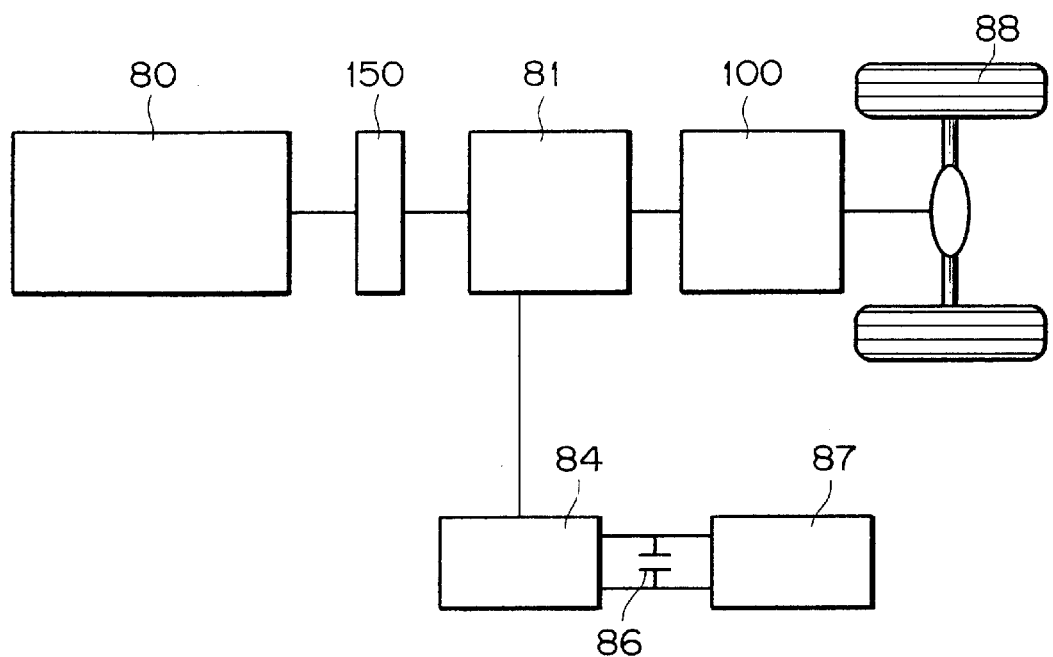
FIG. 29 shows a further embodiment of the present invention.

FIG. 29 shows a still further embodiment of the present invention. The vehicle according to this embodiment is provided with an engine 80 which permits the air/fuel ratio to be changeable, a continuously variable transmission 100 capable of changing the change gear ratio in a stepless manner, and a torque assisting motor generator 81. The engine can diminish the pumping loss by a lean burn operation. Cylinder-direct fuel injection is desirable because the air/fuel ration in a lean burn operation can be made large. But there may be adopted an intake port injection. For motor operation during engine stop there is used a clutch 150 to disconnect the motor generator 81 and the engine 80 from each other.

Figure 30:
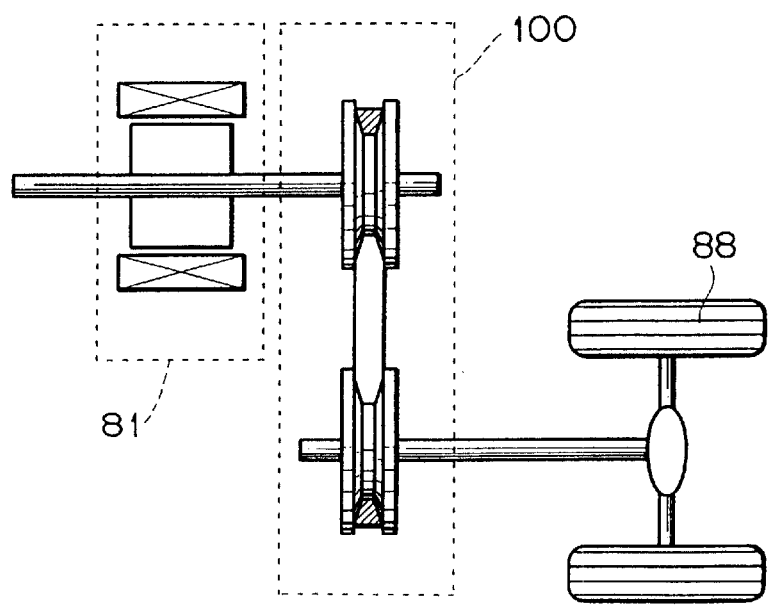
FIG. 30 shows a further embodiment of the present invention.

FIG. 30 shows the configuration of the continuously variable transmission 100 and that of the motor generator 81. A motor may be rendered integral with a driving shaft to assist the motor, whereby the motor arrangement can be made compact.

Figure 31:
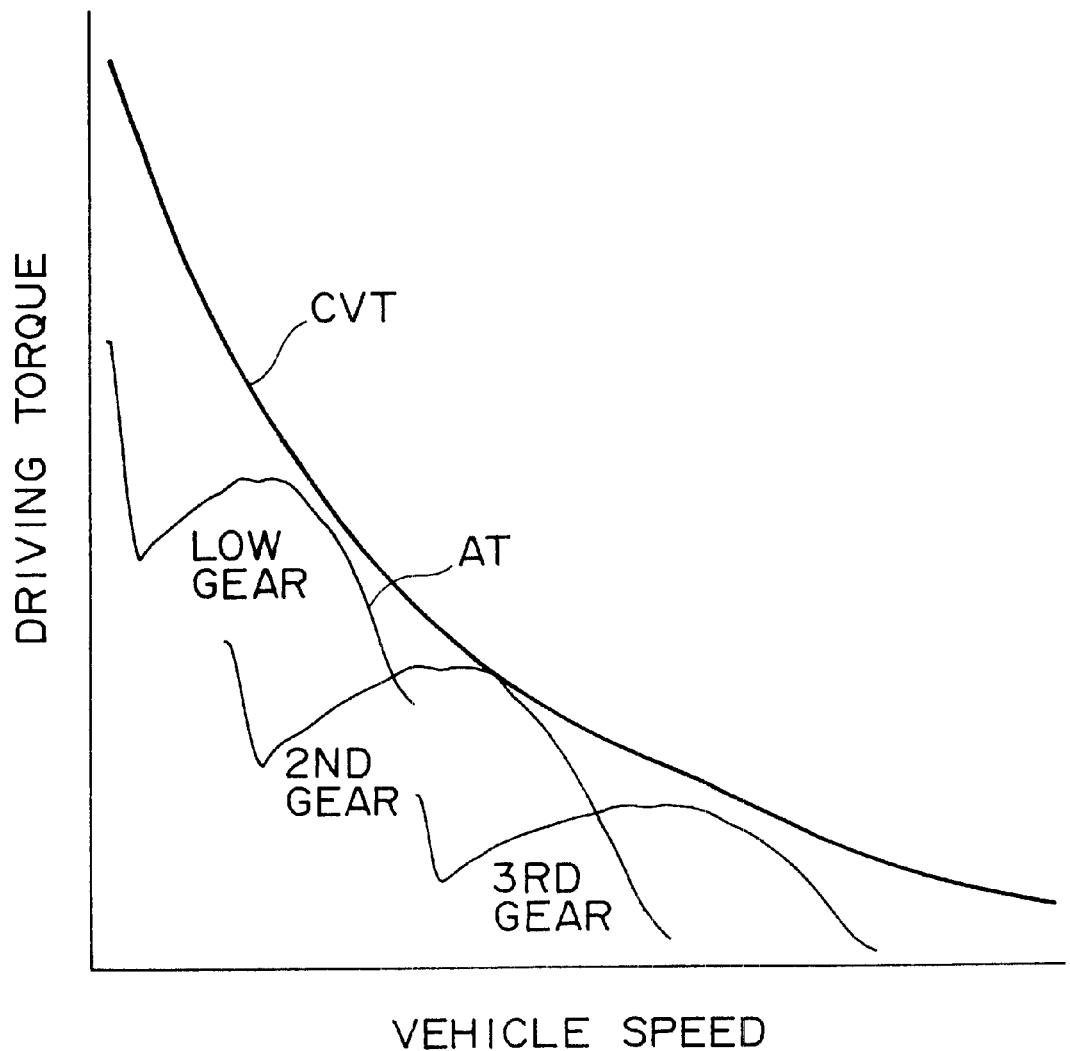
FIG. 31 shows an operation of a continuously variable transmission.

FIG. 31 shows a relation between the vehicle speed and a driving shaft torque. In case of the continuously variable transmission 100, the driving shaft torque can be varied continuously because it is possible to change the change gear ratio continuously. Consequently, it is not necessary to perform such a torque doubling operation using a torque converter as in a stepped transmission, so that the deterioration of transfer efficiency in the torque converter can be avoided. Besides, the driving torque can be controlled continuously relative to the engine torque.

Figure 32:
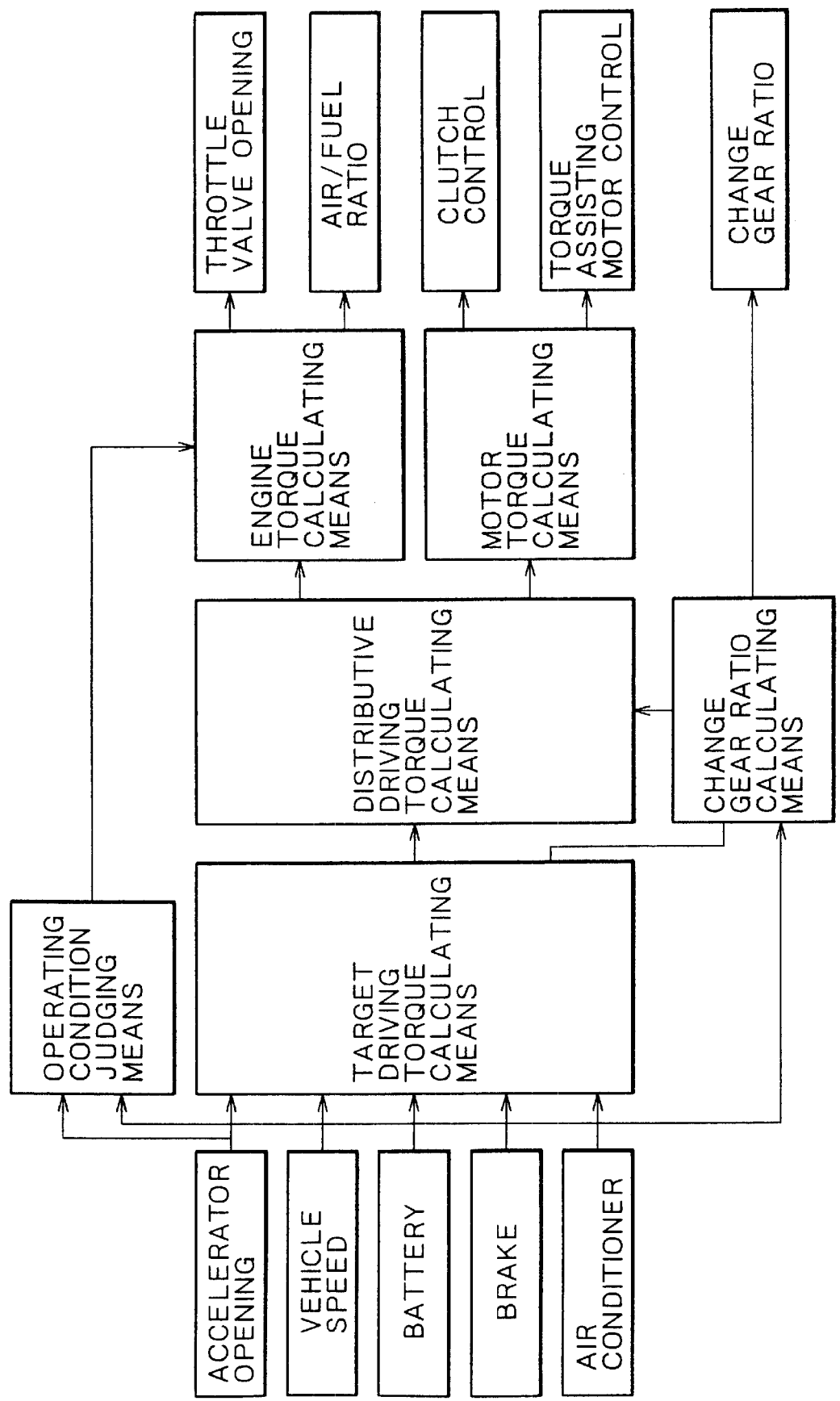
FIG. 32 is a block diagram according to the present invention.

FIG. 32 is a block diagram according to the present invention. A change gear ratio and a distributive driving torque are calculated relative to a target driving torque and there are calculated an engine torque and a motor torque. In accordance with the engine torque and engine speed there are calculated such air/fuel ratio and throttle valve opening as will afford a high efficiency. When the engine torque is low, the clutch is released and the torque assisting motor is controlled. The change gear ratio of the continuously variable transmission is controlled in accordance with a target change gear ratio.

A highly efficient air/fuel ratio is selected for the engine on the basis of engine torque and engine speed as in FIGS. 8 and 15. In case of intake port injection, a limit is encountered at an air/fuel ratio of 25 or so in a lean operation.

Figure 33:
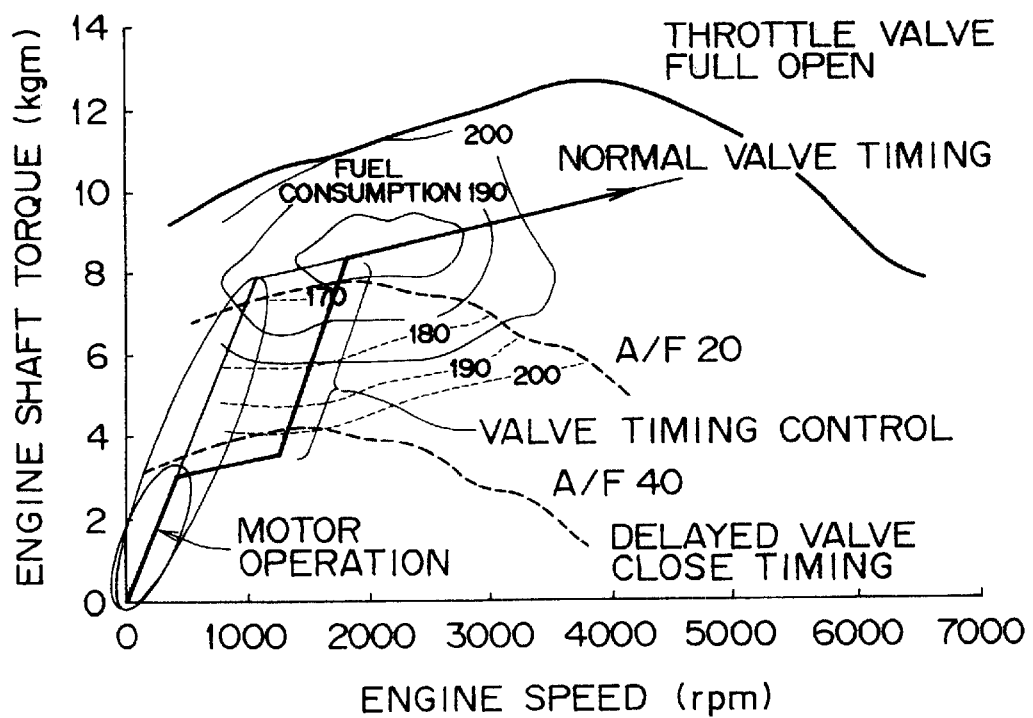
FIG. 33 is an operation explaining diagram according to the present invention.

FIG. 33 shows a further example of an operating method according to the present invention. Since the pumping loss can be diminished by performing operation of the engine while changing the intake valve operation timing and by changing the quantity of intake air instead of changing the air/fuel ratio, there may be conducted an intake valve control. Further, there may be adopted EGR (exhaust gas recirculation) for diminishing the pumping loss.

Figure 34:
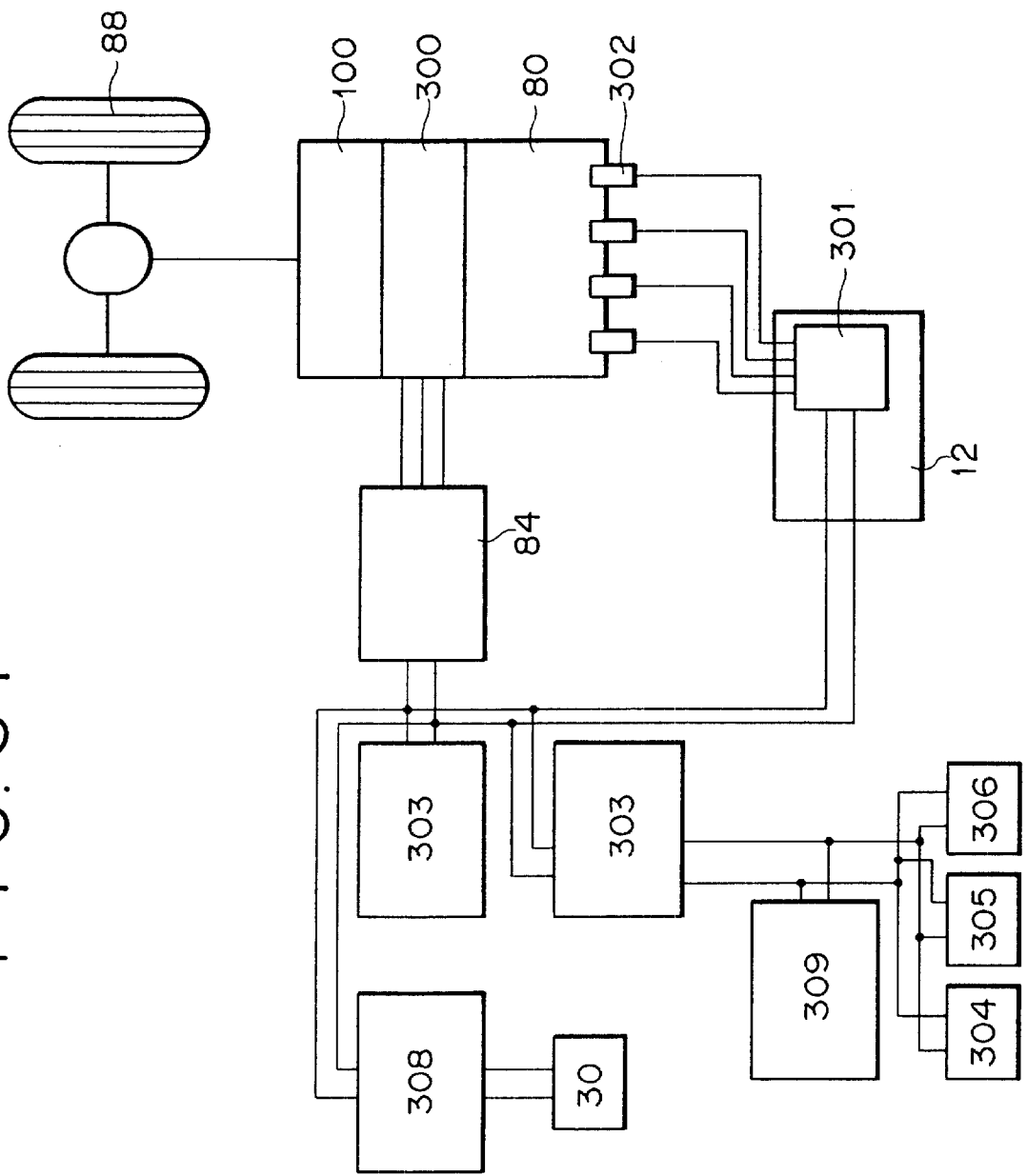
FIG. 34 shows a further embodiment of the present invention.

FIG. 34 shows a still further embodiment of the present invention. In this embodiment, a motor generator 300 is disposed between a cylinder-direct fuel injection type engine 80 and a transmission 100. The transmission is connected to driving wheels 88. The motor generator 300, as a motor, has a driving force assisting function at the time of start-up and acceleration of the engine and also has an engine torque variation absorbing function. Also, as a generator, the motor generator 300 can generate electric power through energy recovery in a decelerative operation or through engine operation and can supply the required electric power. The motor generator 300 is connected to a battery 303 via an inverter 84. The battery 303 is a 42V battery for example. To the battery 303 is connected a DC—DC converter 310 for stepping down, which is connected also to a battery 309. The battery 309 is a 14V battery for example. To the battery 309 are connected other auxiliary electric devices 304 to 306. A DC—DC converter 308 for stepping up may be connected to the batteries 303 to operate a drive circuit 30 for electromagnetic intake and exhaust valves.

For example, a drive circuit 301 for fuel injection valves 302 is connected to the batteries 303 to actuate the fuel injection valves. Usually, in a cylinder-direct fuel injection type engine, a valve opening/closing time responsivity of 1 ms or less is required, assuming that the fuel pressure is 100 atm., so it is necessary to supply a voltage of 40V or more. Therefore, in the case where only a 14V battery is provided, it is necessary that a DC—DC converter be used for actuating the fuel injection valves, thus leading to an increase of cost. The use of the 42V battery eliminates the need of using a DC—DC converter in the fuel injection valve driving circuit, whereby the circuit configuration is simplified and it becomes possible for the circuit to be formed on the same board as that of the engine control unit. Besides, as compared with the voltage level of 14V, the higher voltage permits a decrease of the electric current used even in case of operating other electric actuators. Thus, the use of the 42V battery is effective also in reducing the actuator size.

By such a combination of idling stop with a cylinder-direct fuel injection type engine as in the present invention there can be attained a decrease of fuel consumption during idling, which is attained by idling stop, and also during vehicular traveling, which is attained by a lean burn operation through cylinder-direct fuel injection. In case of port injection, if idling stop is repeated, fuel adheres to the intake pipes during cranking at the time of start-up of the engine and the discharge of exhaust gas is apt to be deteriorated, but the cylinder-direct fuel injection is advantageous in that it prevents such an adhesion of fuel to the intake pipes and improve the discharge of exhaust gas.

Figure 35:
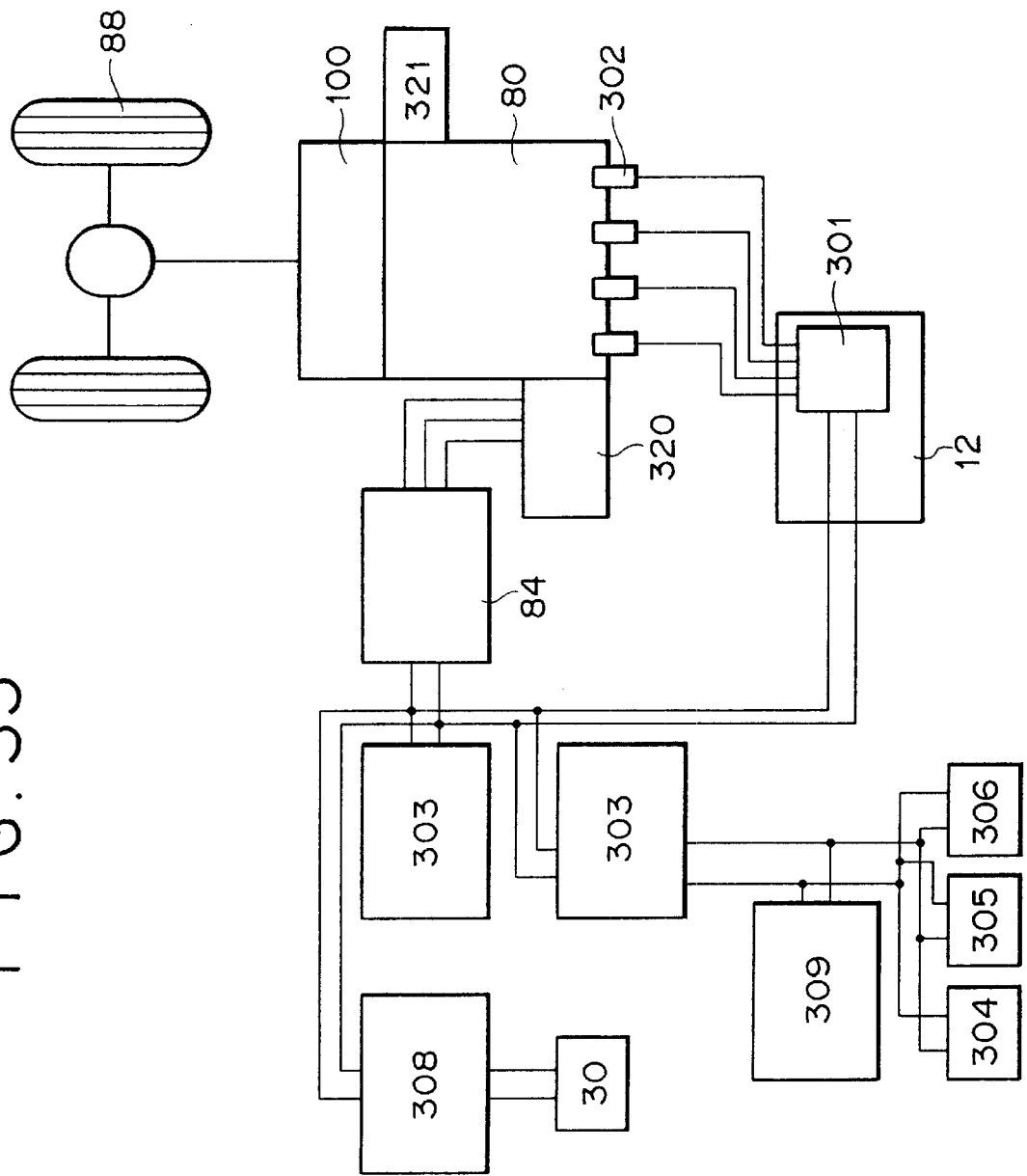
FIG. 35 shows a further embodiment of the present invention.

FIG. 35 shows a still further embodiment of the present invention. In this embodiment, an alternator 84 which generates a voltage of say 42V is provided in an engine. A starter 321 is provided separately. According to such a configuration, the supply of 42V is feasible without greatly changing the conventional engine layout.

Figure 36:
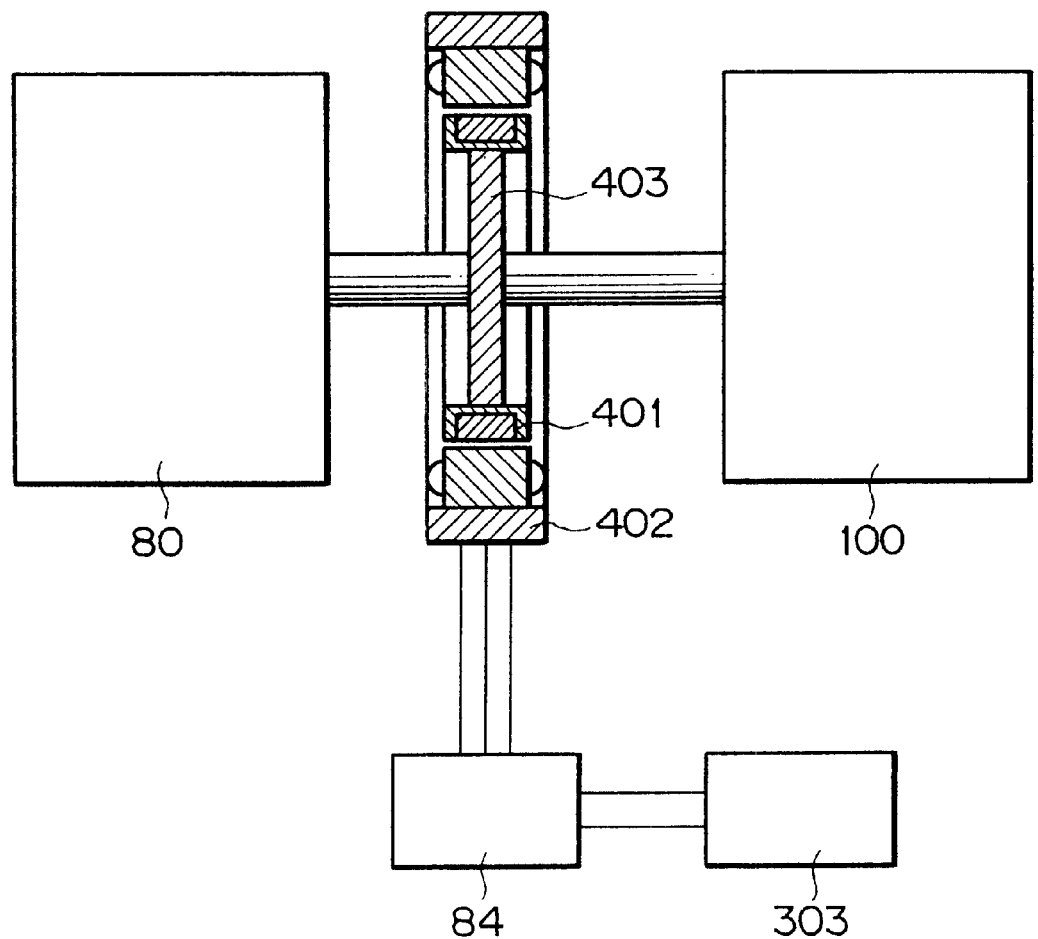
FIG. 36 is an operation explaining diagram according to the present invention.

FIG. 36 shows a configuration example of a motor generator 300. A rotor 403 is connected between an engine 80 and a transmission 100, with a permanent magnet 401 being attached to the rotor. To the coil of a stator 402 are connected an inverter 84 and a battery 303. By controlling the inverter there is obtained an operation as a motor or as a generator.

Figure 37:
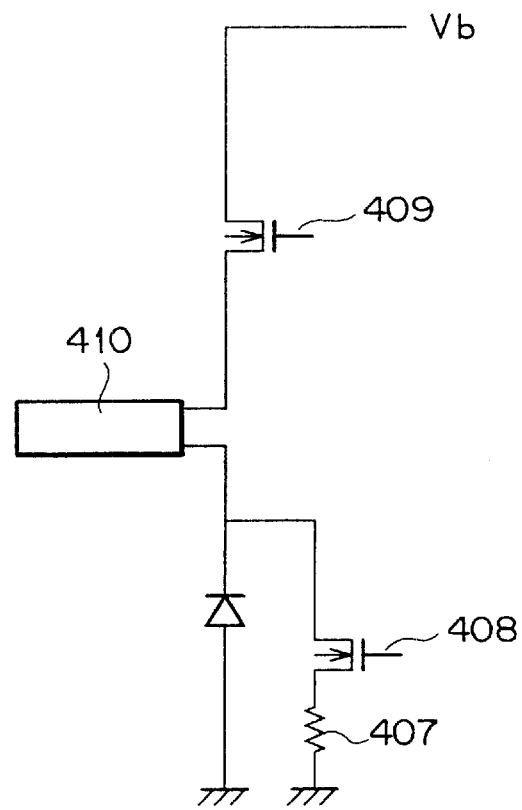
FIG. 37 shows an injection valve driving circuit.
Figure 38:
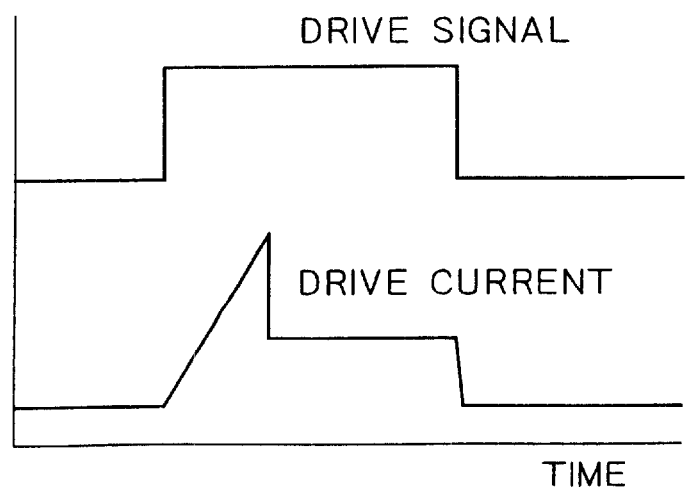
FIG. 38 shows a driving current waveform.

FIG. 37 shows an example of an injection valve driving circuit. An injection valve coil 410 controls the voltage from the battery 303 through switches (e.g. MOSFET) 409 and 408. As shown in FIG. 38, by controlling the driving current in accordance with an injection drive signal (opening/closing signal), the injection valve opening time can be shortened and the holding current during valve opening can be decreased.

Figure 39:
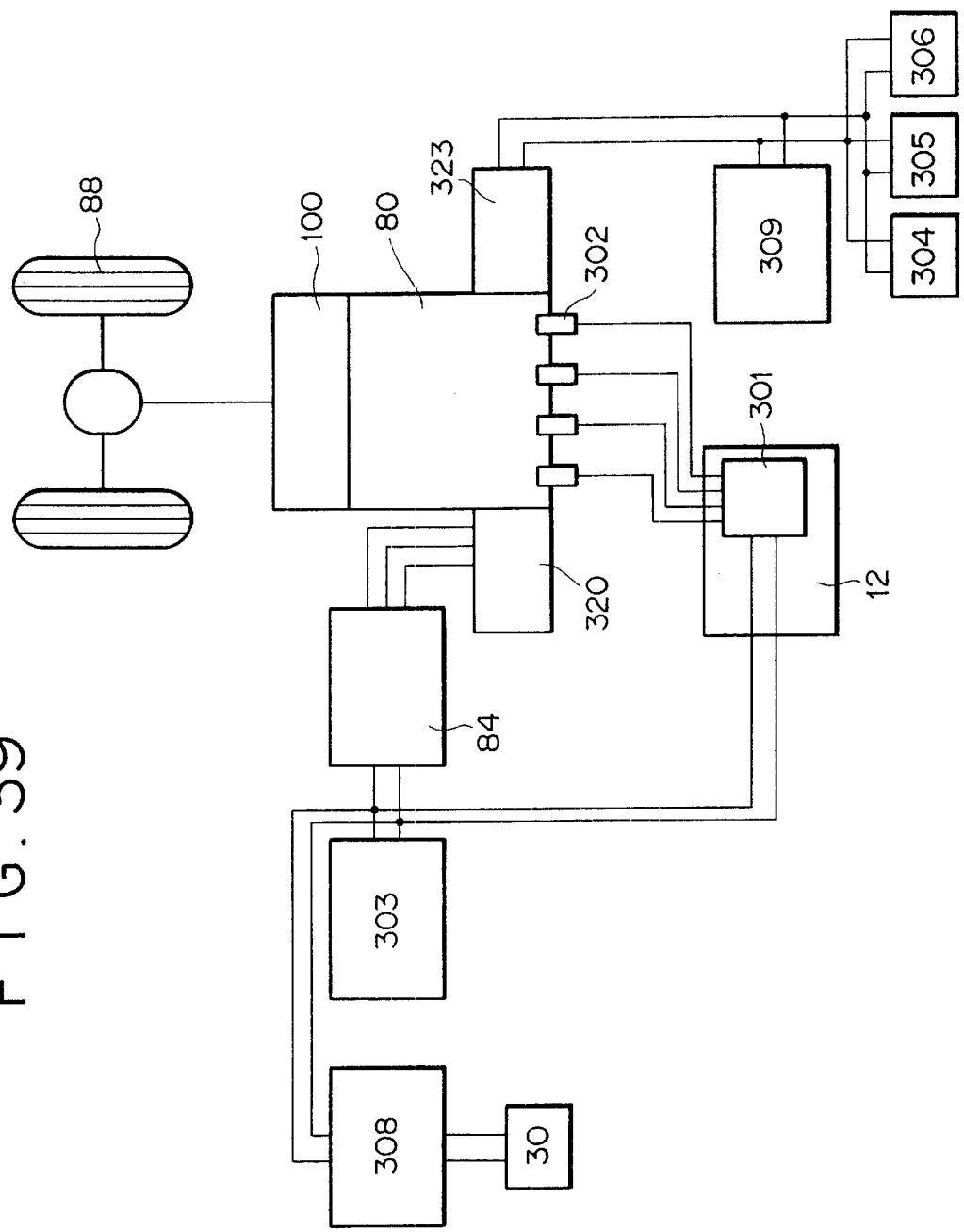
FIG. 39 shows a further embodiment of the present invention.

FIG. 39 shows a still further embodiment of the present invention. In this embodiment there are used two alternators 320 and 323 of different generated voltages, whereby voltages of say 14V and 42V can be generated and it is possible to omit the use of a DC—DC converter for stepping down for example.

INDUSTRIAL APPLICABILITY

According to the present invention it is possible to provide a hybrid vehicle of an engine-electric motor configuration which makes a highly efficient operation possible without increasing the motor capacity and battery capacity and it is also possible to ensure a satisfactory driving performance in a highly efficient operation.

These can be realized by performing a lean burn operation to enlarge the region of a highly efficient operation and by increasing the proportion of engine operation and decreasing the proportion of motor operation using a battery in a low torque condition. The lean burn operation is advantageous in that the pumping loss can be diminished because the throttle valve is opened. In this case, for diminishing the pumping loss in a low torque engine operation, there may be adopted a method wherein the intake valve timing is controlled to adjust the quantity of intake air.

A vehicular operation at a required engine output can be realized by selecting a region of a high engine speed to ensure a marginal torque. For example, whether the vehicle driver thinks much of fuel economy or driving performance is judged on the basis of a change in the degree of opening of the accelerator pedal, and when importance is attached to the driving performance, there is selected an engine operation region having a large marginal torque. In the region of a high engine speed the fuel economy is slightly deteriorated relative to the point of the highest efficiency, but it becomes possible to improve the driving performance.

What is claimed is:

1. A hybrid car on which an engine is mounted and generates a driving force to drive the hybrid car wherein said engine performs a lean burn operation, and wherein a motor is mounted on the hybrid car and generates a driving force to drive the hybrid car, said hybrid car comprising:

means for providing a first operation area in which the hybrid car is driven by said motor;

means for providing a second operation area changed over from said first operation area;

means to provide an opening degree of a throttle valve of said engine to perform an opening condition, by making an air/fuel ratio of said engine larger than a stoichiometric value when said engine is driven, and the hybrid car is driven by said engine; and means for providing a third operation area changed over from said second operation area, by changing the stoichiometric value when said engine is driven and the hybrid car is driven by said engine.

2. The hybrid car according to claim 1, wherein said engine is a cylinder-direct fuel injection type engine.

3. The hybrid car according to claim 1, further including:

a power distributing mechanism for distributing the power of said engine wherein said motor includes a torque assisting motor generator disposed on an output shaft of said power distributing mechanism and a differential motor generator connected to an input shaft of said power distributing mechanism;

a driving shaft connected to said torque assisting motor generator;

a battery connected electrically to both said torque assisting motor generator and said differential motor generator through an inverter; and an engine controlling unit which makes the air/fuel ratio of said engine variable.

4. A hybrid car according to claim 3, wherein when the engine torque is smaller than a predetermined value, said torque assisting motor generator is operated as a motor, allowing the vehicular operation to be performed with the motor, while when a larger engine output is required, the vehicular operation is performed with the engine, and the air/fuel ratio in the engine is varied from a value corresponding to a lean air/fuel ratio to smaller values according to engine torques.

5. The hybrid car according to claim 3, wherein the engine is operated at an air/fuel ratio leaner than a stoichiometric air/fuel ratio, the air/fuel ratio is varied stepwise, and said torque assisting motor generator is operated as a motor so that there is no difference in driving torque at the time of changing the air/fuel ratio.

6. The hybrid car according to claim 3, wherein for deceleration in an operational condition of a large throttle valve opening, said torque assisting motor generator is operated as a generator, thereby effecting the recovery of energy and the application of an engine brake.

* * * * *